US012769032B2

(12) United States Patent
Hao et al.

(10) Patent No.: US 12,769,032 B2
(45) Date of Patent: Oct. 20, 2026

(54) RELAY REDIRECTOR, DISPLAY DEVICE AND NEAR-EYE DISPLAY SYSTEM

(71) Applicant: SHENZHEN METALENX TECHNOLOGY CO., LTD, Shenzhen (CN)

(72) Inventors: Chenglong Hao, Shenzhen (CN); Fengze Tan, Shenzhen (CN); Jian Zhu, Shenzhen (CN)

(73) Assignee: SHENZHEN METALENX TECHNOLOGY CO., LTD, Shenzhen (CN)

( * ) Notice: Subject to any disclaimer, the term of this patent is extended or adjusted under 35 U.S.C. 154(b) by 318 days.

(21) Appl. No.: 18/610,161

(22) Filed: Mar. 19, 2024

(65) Prior Publication Data

US 2024/0230953 A1 Jul. 11, 2024

Related U.S. Application Data

(63) Continuation of application No. PCT/CN2022/098303, filed on Jun. 13, 2022.

(30) Foreign Application Priority Data

Oct. 26, 2021 (CN) ........................ 202111250247.5

(51) Int. Cl.
*G02B 1/00* (2006.01)
*B82Y 20/00* (2011.01)
(Continued)

(52) U.S. Cl.
CPC .............. *G02B 1/002* (2013.01); *B82Y 20/00* (2013.01); *G02B 27/0068* (2013.01);
(Continued)

(58) Field of Classification Search
CPC ................ G02B 1/002; G02B 27/0068; G02B 27/0172; G02B 27/0972; G02B 2207/101; G02B 27/01; B82Y 20/00; Y02D 30/70
(Continued)

(56) References Cited

U.S. PATENT DOCUMENTS

2017/0322418 A1* 11/2017 Lin .......................... G02B 5/30
2019/0137762 A1 5/2019 Hu
(Continued)

FOREIGN PATENT DOCUMENTS

CN 111679362 9/2020
CN 113424090 9/2021
(Continued)

OTHER PUBLICATIONS

"International Search Report (Form PCT/ISA/210) of PCT/CN2022/098303," mailed on Sep. 1, 2022, with English translation thereof, pp. 1-5.

*Primary Examiner* — Mohammed A Hasan
(74) *Attorney, Agent, or Firm* — JCIPRNET

(57) ABSTRACT

Provided are a relay redirector, a display device and a near-eye display system. The relay redirector includes a metasurface and a supporting part. The metasurface is arranged on the supporting part. The metasurface is configured to adjust a propagation direction of outgoing light leaving the metasurface by modulating a phase of incident light hitting the metasurface, so as to direct the incident light hitting the metasurface towards a light-outgoing side of the metasurface and form a real image in a preset area on the light-outgoing side of the metasurface.

19 Claims, 10 Drawing Sheets

(51) Int. Cl.

| | |
|---|---|
| ***G02B 27/00*** | (2006.01) |
| ***G02B 27/01*** | (2006.01) |
| ***G02B 27/09*** | (2006.01) |

(52) U.S. Cl.
CPC ..... *G02B 27/0172* (2013.01); *G02B 27/0972* (2013.01); *G02B 2207/101* (2013.01)

(58) Field of Classification Search
USPC .......................................................... 359/237
See application file for complete search history.

(56) References Cited

U.S. PATENT DOCUMENTS

| | | | | |
|---|---|---|---|---|
| 2022/0011161 | A1* | 1/2022 | Han | G01J 3/447 |
| 2022/0365482 | A1* | 11/2022 | Yu | G03H 1/0248 |
| 2023/0085245 | A1* | 3/2023 | Yin | G02B 1/007<br>359/642 |
| 2025/0147319 | A1* | 5/2025 | Yun | G02B 5/18 |

FOREIGN PATENT DOCUMENTS

| | | | | | |
|---|---|---|---|---|---|
| CN | 113424090 | A | * | 9/2021 | G06V 40/19 |
| CN | 214335365 | | | 10/2021 | |
| CN | 113934005 | A | * | 1/2022 | G02B 27/01 |

* cited by examiner

RELAY REDIRECTOR, DISPLAY DEVICE AND NEAR-EYE DISPLAY SYSTEM

CROSS-REFERENCE TO RELATED APPLICATION

This application is a continuation of International Patent Application of PCT application serial No. PCT/CN2022/098303, filed on Jun. 13, 2022, which claims the benefit of priority from China Application No. 202111250247.5, filed on Oct. 26, 2021. The content of the aforementioned applications, including any intervening amendments thereto, are incorporated herein by reference.

TECHNICAL FIELD

The present disclosure relates to the field of imaging equipment, in particular to a relay redirector, a display device and a near-eye display system.

BACKGROUND

Near-eye display systems such as Augmented Reality (AR) glasses are wearable devices that add a projected image of a microdisplay over a real-world environment seen by an observer, so as to enhance reality.

Existing near-eye display systems generally require a relay lensing set to lengthen a projection light path, such that an image (e.g., a magnified image) of the microdisplay is projected to an image combiner, and then the image combiner presents the projected image in front of the observer, whereby real images and the projected images simultaneously fall into eyes of the observer. Moreover, the microdisplay in most near-eye display systems is usually arranged on a glasses temple of a spectacle frame, in this case, it is required to additionally arrange a light-deflecting device composed of prisms or reflectors, so as to project light to the image combiner and reduce volume of the near-eye display systems.

Whereas, a plurality of traditional refractive/reflective optical elements are requisite in the existing relay lensing sets and the light-deflecting device, rendering the whole projection light path system bulky, weighty and systemically complicated.

SUMMARY

In view of the above technical problems, a relay redirector, a display device and a near-eye display system are provided according to embodiments of the present disclosure.

In a first aspect of the present disclosure, a relay redirector is provided. The relay redirector includes a metasurface and a supporting part. The metasurface is arranged on the supporting part. The metasurface is configured to adjust a propagation direction of outgoing light leaving the metasurface by modulating a phase of incident light hitting the metasurface, so as to direct the incident light hitting the metasurface towards a light-outgoing side of the metasurface and form a real image in a preset area on the light-outgoing side of the metasurface.

In an embodiment, the metasurface includes a transmissive metasurface and a reflective element. The transmissive metasurface includes a plurality of transmissive unit cells being capable of providing a modulation phase; the transmissive unit cells are configured to transmit at least part of incident light hitting the transmissive unit cells to obtain transmitted light leaving the transmissive metasurface; the transmitted light leaving the transmissive metasurface is capable of forming the real image; and the reflective element is configured to reflect incident light hitting the reflective element to the light-outgoing side of the metasurface.

In an embodiment, a first deflection angle is greater than or equal to a second deflection angle; the first deflection angle refers to a deflection angle of a first propagation direction of the incident light entering the transmissive unit cells relative to the transmission reference position; and the second deflection angle refers to a deflection angle of a second propagation direction of transmitted light leaving the transmissive unit cells relative to the transmission reference position; and the transmission reference position is coplanar with the transmissive metasurface.

In an embodiment, a difference between a cotangent value of the second deflection angle and a cotangent value of the first deflection angle is a constant value; and the constant value is positively correlated to a distance between the transmissive unit cells to the transmission reference position.

In an embodiment, the transmissive metasurface is configured to transmit the incident light hitting the transmissive unit cells to the reflective element; and the reflective element is configured to reflect the transmitted light leaving the transmissive metasurface to the light-outgoing side of the metasurface; or, the reflective element is configured to reflect the incident light hitting the reflective element to the transmissive metasurface to obtain reflected light leaving the reflective element, and the transmissive metasurface is configured to transmit the reflected light leaving the reflective element to the light-outgoing side of the metasurface.

In an embodiment, the supporting part includes a relay substrate; and the relay substrate at least includes a light-entering surface, a reflecting surface and a light-outgoing surface; the reflective element is arranged on the reflecting surface, and is configured to reflect incident light hitting the light-entering surface to the light-outgoing surface; and the transmissive metasurface is provided on the light-entering surface or the light-outgoing surface.

In an embodiment, the transmissive metasurface includes a first transparent substrate layer and a plurality of nanostructures on the first transparent substrate layer.

In an embodiment, the modulation phase provided by the transmissive unit cells is expressed by a following formula:

$$\varphi(r, \lambda_i) = \frac{2\pi}{\lambda_i}\sum_j a_{i,j} r^{2j},$$

$$j = 1, 2, \ldots, N;$$

where, r is a radial coordinate of the transmissive unit cells, $\lambda_i$ is an i-th wavelength that needs to be adjusted, $a_{i,j}$ is a preset j-th phase coefficient corresponding to the i-th wavelength, and N is a positive integer and is not less than 3.

In an embodiment, the metasurface includes a reflective metasurface; the reflective metasurface is configured to be divided into a plurality of reflective unit cells capable of providing a modulation phase; the reflective unit cells are configured to direct at least part of light from a first position towards a second position in the preset area, so as to form the real image at the second position; and the first position and the second position are in a one-to-one correspondence.

In an embodiment, the supporting part includes a supporting layer; the reflective metasurface is provided on the support layer; or the supporting part includes a relay substrate; the relay substrate at least includes a light-entering surface, a reflecting surface and a light-outgoing surface; the reflective metasurface is provided on the reflecting surface for directing incident light from the light-entering surface towards the light-outgoing surface.

In an embodiment, the reflective metasurface includes a reflective layer and a plurality of nanostructures; and the plurality of the nanostructures are provided on a side of the reflective layer close to a light-entering side and the light-outgoing side of the metasurface; or the reflective metasurface includes a reflective layer, a second transparent substrate layer and a plurality of nanostructures; the second transparent substrate layer is provided on the side of the reflective layer close to the light-entering side and the light-outgoing side of the metasurface; and a plurality of the nanostructures are provided on a side of the second transparent substrate layer away from the reflective layer.

In an embodiment, the light-entering surface of the relay substrate is perpendicular to the light-outgoing surface of the relay substrate.

In a second aspect of the present disclosure, a display device is provided. The display device includes the relay redirector as described in any of the above embodiments and an image combiner; the relay redirector is configured to generate the real image on a light-entering side of the image combiner; and the image combiner is configured to modulate imaging light emitted by the real image to an observation area.

In an embodiment, the image combiner includes a free-form prism and a compensator; the free-form prism includes a transmissive surface, a transflective surface and a light-splitting surface; the compensator is provided on the light-splitting surface; the transmissive surface is configured to transmit the imaging light emitted by the real image and direct the transmitted imaging light towards the transflective surface; the transflective surface is configured to totally reflect the imaging light transmitted by the transmissive surface to the light-splitting surface; the light-splitting surface is configured to reflect the imaging light totally reflected by the transflective surface to the transflective surface; the transflective surface is also configured to transmit the imaging light reflected by the light-splitting surface; and the compensator is configured to compensate dioptric power of the free-form prism, so that the image combiner is afocal.

In an embodiment, the compensator includes a prism substrate and a compensation element; the compensation element is configured to be divided into a plurality of metasurface unit cells; the compensation element is provided on a side of the prism substrate; the metasurface unit cells of the compensation element are configured to provide a compensation phase for light passing through the metasurface unit cells; and a propagation direction of incident light traveling towards the compensator is the same as a propagation direction of outgoing light obtained after the incident light sequentially passes through the metasurface unit cells, the prism substrate and the free-form prism arranged on a light-outgoing side of the prism substrate.

In an embodiment, phase errors of the metasurface unit cells at a plurality of target wavelengths meet a minimum error condition; and respective phase errors refer to a difference between an actual compensation phase provided by the metasurface unit cells at the target wavelengths and a theoretical compensation phase required to be provided by the metasurface unit cells at the same target wavelengths.

In an embodiment, the minimum error condition is satisfied when a weighted sum of the phase errors is minimum, and the weighted sum of the phase errors is expressed by a following formula:

$$\Delta_m^{x,y} = \sum_i c_i |\varphi_{the}(\lambda_i, x, y) - \varphi_m(\lambda_i, x, y)|;$$

where, (x, y) represents coordinates of respective metasurface unit cells, m is a serial number of a metasurface unit cell at (x, y) in a structural database, $\lambda_i$ is an i-th target wavelength, and $c_i$ is a weight coefficient of the i-th target wavelength $\lambda_i$; $\varphi_m(\lambda_i, x, y)$ is an actual compensation phase provided by the metasurface unit cell at (x, y) at the i-th target wavelength $\lambda_i$; $\varphi_{the}(\lambda_i, x, y)$ is a theoretical compensation phase required to be provided by the metasurface unit cell at (x, y) at the i-th target wavelength $\lambda_i$ and is expressed by a following formula:

$$\varphi_{the}(\lambda_i, x, y) = \mathrm{mod}\left(-\frac{2\pi}{\lambda_i} n_1 t_{x,y} - \frac{2\pi}{\lambda_i} n_2 T_{x,y}, 2\pi\right);$$

where, $n_1$ is a refractive index of the prism substrate, $t_{x,y}$ is a thickness of the prism substrate in a light propagation direction corresponding to the metasurface unit cell at (x, y), and $n_2$ is a refractive index of the free-form prism, $T_{x,y}$ is a thickness of the free-form prism in a light propagation direction corresponding to the metasurface unit cell at (x, y).

In an embodiment, the compensation element includes a third transparent substrate layer and a plurality of second nanostructures; respective second nanostructures are of an upright structure having a central axis in a height direction of the upright structure; and the upright structure has a first symmetric plane and a second symmetric plane that are perpendicular to each other; the first symmetric plane and the second symmetric plane intersect at the central axis of the upright structure; an intersection between the first symmetric plane and the upright structure forms a first intersection line, and an intersection between the second symmetric plane and the upright structure forms a second intersection line; a shape of the first intersection line is the same as a shape of the second intersection line.

In a third aspect of the present disclosure, a near-eye display system is provided. The near-eye display system includes the display device as described in any of the above embodiments.

In technical solutions of the first aspect of the present disclosure, the metasurface modulates the imaging light, so as to easily form the real image. Compared with the traditional relay lensing set, the relay redirector of the present embodiment includes a metasurface, in which metasurface elements (such as the reflective metasurface, and the transmissive metasurface) can realize imaging. The use of the metasurface has significant advantages, for example, there is no need to stack a large number of optical components that are thick, which cuts down the number of the optical components, decreases the required volume for the projection light path, reduces the weight, lowers the difficulties of adjustment and assembly, and simplifies the system. Moreover, the metasurface is able to be mass-produced by semiconductor processes, which has benefits of the high production capacity, the simple manufacture process, the low cost, and the high yield and the reduced design difficulty.

It should be understood that, the foregoing general descriptions and the following detailed descriptions are merely for exemplary and explanatory purposes and are not intended to limit the present disclosure.

BRIEF DESCRIPTION OF THE DRAWINGS

In order to explain embodiments of the present disclosure or the prior art more clearly, drawings used in the description of the embodiments or the prior art will be briefly explained below. Obviously, the following drawings are merely for exemplary and explanatory purposes. It is understood by those skilled in the art that without paying any creative efforts, other drawings are available based on the following drawings.

DETAILED DESCRIPTION OF THE EMBODIMENTS

Figure 1:
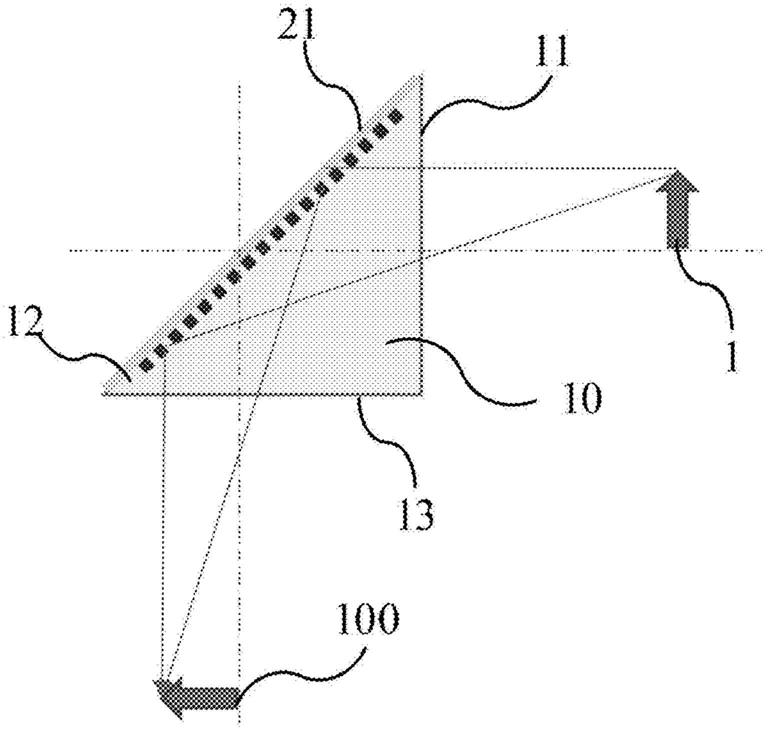
FIG. 1 schematically shows a first structure of a relay redirector according to an embodiment of the present disclosure.

It should be understood that terms used in the present disclosure, such as "central", "longitudinal", "transverse", "length", "width", "thickness", "upper", "lower", "front", "rear", "left", "right", "vertical", "horizontal", "top", "bottom", "interior", "exterior", "clockwise", "counterclockwise" which are intended to indicate orientational or positional relationships based on the accompanying drawings are only for the purpose of describing the present disclosure conveniently and simply, and are not intended to indicate or imply a particular orientation, a structure and an operation in a particular orientation of the device or element referred to herein, and thus are not to be interpreted as a limitation to the present disclosure.

In addition, terms "first" and "second" are used for descriptive purposes, and are not intended to indicate or imply relative importance or implicitly indicate the quantity of the indicated technical features. Therefore, features defined by "first" or "second" may explicitly or implicitly include one or more of these features. In the description of the present disclosure, "plurality" or "multiple" means that there are two or more of these features, unless otherwise explicitly and specifically defined.

In the present disclosure, unless otherwise clearly stated and defined, terms "assemble", "connect", "joint", "fix" and the like should be understood in a broad sense. For example, these terms may be referred to as "fixedly connect", "detachably connect", or "integrally connected"; these terms may also be referred to as "mechanically connect" or "electrically connect"; these terms may be further referred to as "directly connect", "indirectly connected by an intermediary" or "communicated between an interior of an element and an interior of another element". It is understandable to a person having ordinary skill in the art that the terms set forth are interpreted according to specific scenarios of the present disclosure.

The present embodiment provides a relay redirector. The relay redirector includes a metasurface and a supporting part. The metasurface is arranged on the supporting part; the metasurface is configured to adjust a propagation direction of outgoing light leaving the metasurface by modulating a phase of incident light hitting the metasurface, so as to direct the incident light hitting the metasurface towards a light-outgoing side of the metasurface and form a real image in a preset area on the light-outgoing side of the metasurface.

In the present embodiment, the metasurface is an optical element manufactured by metasurface related technologies. The metasurface is configured to modulate a phase of the incident light hitting the metasurface, so as to adjust a propagation direction of outgoing light leaving the metasurface and enable the outgoing light leaving the metasurface to form a real image. The supporting part mainly fastens and supports the metasurface. At least a part of the supporting part is transparent to light that is required to pass through the supporting part. Where, the wording "transparent" of the present embodiment refers to being able to transmit light within a preset wavelength band, with the transmittance being higher than a preset threshold. In an example, the wording "transparent" may refer to being able to transmit light within a visible spectrum, with the transmittance being not less than 80%, 90%, 95%, etc.

As shown in FIG. 1, the supporting part may mainly include a relay substrate 10. The metasurface is arranged on the relay substrate 10. In the present embodiment, the metasurface is capable of modulating a phase of light, and is also capable of reflecting light. By modulating the phase of the light, a real image is formed. By reflecting the light, the propagation direction of the outgoing light leaving the metasurface is adjusted to a large extent, such that the real image is formed within a preset imaging area. Correspondingly, the metasurface may include elements that are capable of modulating the phase of the light and are also capable of reflecting the light. For example, the metasurface includes the reflective metasurface 21. Or, the metasurface may include a first element that is capable of modulating the phase of the light and a second element that is capable of reflecting the light. For example, the metasurface includes a transmissive metasurface 22 and a reflective element 30.

As shown in FIG. 1, the metasurface may include a reflective metasurface 21, which is able to modulate the phase of the light and reflect the light. The way the reflective metasurface 21 modulates the incident light is analogous to reflection, but is substantially not a specular reflection in the conventional sense. In this embodiment, the way by which the reflective metasurface 21 modulates the incident light is called "quasi-reflection". For light emitted from the same pixel point, the reflective metasurface 21 is capable of performing modulation thereto, so that the outgoing light forms a real image. For example, as shown in FIG. 1, in the case that an image source 1 is provided, the imaging light emitted by the image source 1 is able to propagate towards the reflective metasurface 21, and the reflective metasurface 21 performs quasi-reflection on the incident imaging light, so that the outgoing imaging light travels to the preset area, and forms the real image 100 in the preset area.

Figure 2:
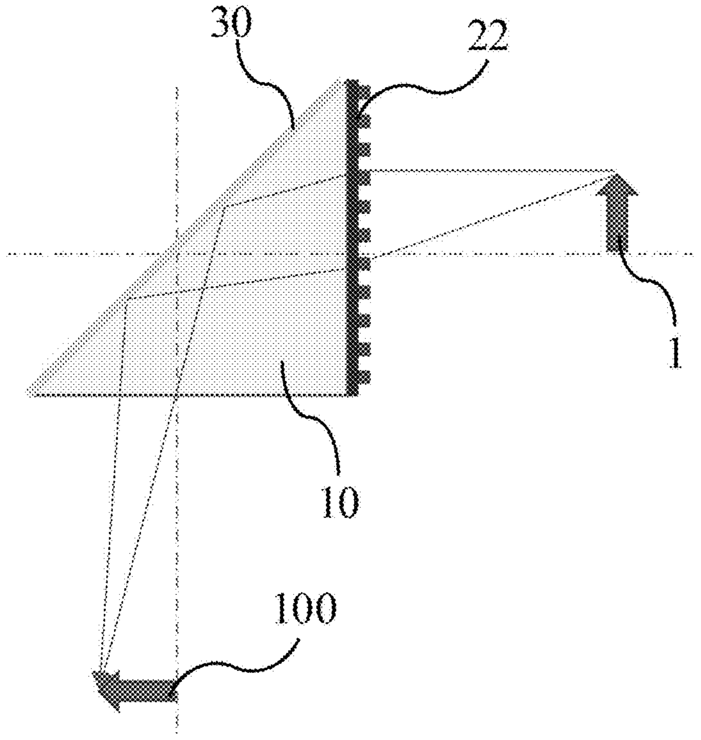
FIG. 2 schematically shows a second structure of a relay redirector according to an embodiment of the present disclosure.

Or, referring to FIG. 2, the metasurface includes a transmissive metasurface 22 and a reflective element 30. The transmissive metasurface 22 is capable of modulating the phase of the incident light. The reflective element 30 is capable of reflecting incident light hitting the reflective element 30. As shown in FIG. 2, in the case that an image source 1 is provided, the imaging light emitted by the image source 1 is able to propagate towards the transmissive metasurface 22, and the transmissive metasurface 22 modulates the phase of the imaging light, so that the outgoing imaging light passing through the transmissive metasurface 22 forms a real image. In addition, the reflective element 30 is able to adjust the light propagation direction, thereby forming the real image in the preset area. As shown in FIG. 2, the reflective element 30 reflects the outgoing imaging light passing through the transmissive metasurface 22, so as to adjust a position of the real image formed by the transmissive metasurface 22, thereby forming the real image 100 in the preset area.

The relay redirector provided in the present embodiment utilizes the metasurface to modulate the imaging light, so as to easily form the real image. Compared with the traditional relay lensing set, the relay redirector of the present embodiment includes a metasurface, in which metasurface elements (such as the reflective metasurface 21, or the transmissive metasurface 22) realize imaging. The use of the metasurface has significant advantages, for example, there is no need to stack a large number of optical components that are thick, which cuts down the number of the optical components, decreases the required volume for the projection light path, reduces the weight, lowers the difficulties of adjustment and assembly, and simplifies the system. Moreover, the metasurface is able to be mass-produced by semiconductor processes, which has benefits of the high production capacity, the simple manufacture process, the low cost, and the high yield and the reduced design difficulty.

Based on any of the above embodiments, as shown in FIG. 1, the metasurface includes a reflective metasurface 21. The reflective metasurface 21 is configured to be divided into a plurality of reflective unit cells which are capable of providing a modulation phase. The reflective unit cells are configured to direct at least part of light from a first position towards a second position in the preset area, so as to form the real image at the second position. The first position and the second position are in a one-to-one correspondence.

In the present embodiment, the reflective metasurface 21 includes a plurality of reflective unit cells. At least a part of the reflective unit cells are able to modulate an incident light hitting the reflective unit cells and provide a compensation phase, so as to adjust a propagation direction of the imaging light, thereby achieving quasi-reflection.

Where, the reflective metasurface 21 includes a plurality of reflective unit cells, which means that the reflective metasurface 21 is abstractively divided into the plurality of reflective unit cells. The aforesaid configuration is not intended to limit the plurality of reflective unit cells to be completely independent of each other in structure. For example, the plurality of reflective unit cells may be in one piece, or, at least a part of reflective unit cells are independent in structure. In an embodiment, different reflective unit cells are arranged on a same substrate. Optionally, different reflective unit cells are arranged at different positions of the same substrate. Respective reflective unit cells are partial structures obtained by conceptually partitioning the reflective metasurface 21.

As shown in FIG. 1, the imaging light emitted from the image source 1 hits corresponding reflective unit cells of the reflective metasurface 21. The reflective unit cells modulate at least part of light hitting the reflective unit cells, so as to adjust a propagation direction of outgoing imaging light leaving the reflective unit cells, such that the imaging light emitted from the same pixel point is quasi-reflected by the reflective metasurface 21 and then converges to form a real image, for example, forming the real image 100 in the preset area. In the present embodiment, the first position is a position from which imaging light is able to be emitted to the reflective metasurface 21. For example, the first position refers to a position of the image source 1; the second position refers to a position where the imaging light from the first position is converged after being modulated by the reflective metasurface 21. The first position and the second position are in a one-to-one correspondence, that is, the imaging light emitted from different first positions is converged at different second positions. Where, the second position may be a certain position within a preset area, and a corresponding real image may be formed at the second position.

Optionally, as shown in FIG. 1, the relay substrate 10 at least includes a light-entering surface 11, a reflective surface 12 and a light-outgoing surface 13. The reflective metasurface 21 is provided at the reflective surface 12, and is configured to modulate light from the light-entering surface 11, such that, the light travels towards the light-outgoing surface 13.

In the present embodiment, a material of the relay substrate 10 is transparent, for example, being a material that is transmissive to visible light. The material of the relay substrate 10 may be glass. The relay substrate 10 includes a light-entering surface 11 and a light-outgoing surface 13. The light-entering surface 11 is able to transmit incident light; and the light-outgoing surface 13 is able to transmit outgoing light. In addition, the relay substrate 10 also includes a reflective surface 12 on which a light-reflecting element is arranged for reflecting light. Where, in order to form a complete optical path, at least a part of the light-entering surface 11 and at least a part of the light-outgoing surface 13 are located on the same side of the reflective surface 12; and the reflective surface 12 is configured to enable the light-reflecting element to be arranged thereon. Referring FIG. 1, the reflective metasurface 21 is arranged on the reflective surface 12. In the present embodiment, the relay substrate 10 may be a prism. FIG. 1 illustratively shows a triangular prism, which is only an embodiment of the relay substrate 10.

The light-entering surface 11 of the relay substrate 10 is transmissive to imaging light, such as the imaging light emitted from the image source 1. The imaging light enters the light-entering surface 11 and travels towards the reflective metasurface 21 located on the reflective surface 12. The imaging light is quasi-reflected by the reflective metasurface 21 and then travels towards the light-outgoing surface 13. After passing through the light-outgoing surface 13, the imaging light converges outside the light-outgoing surface 13 and forms the real image 100.

Figure 3:
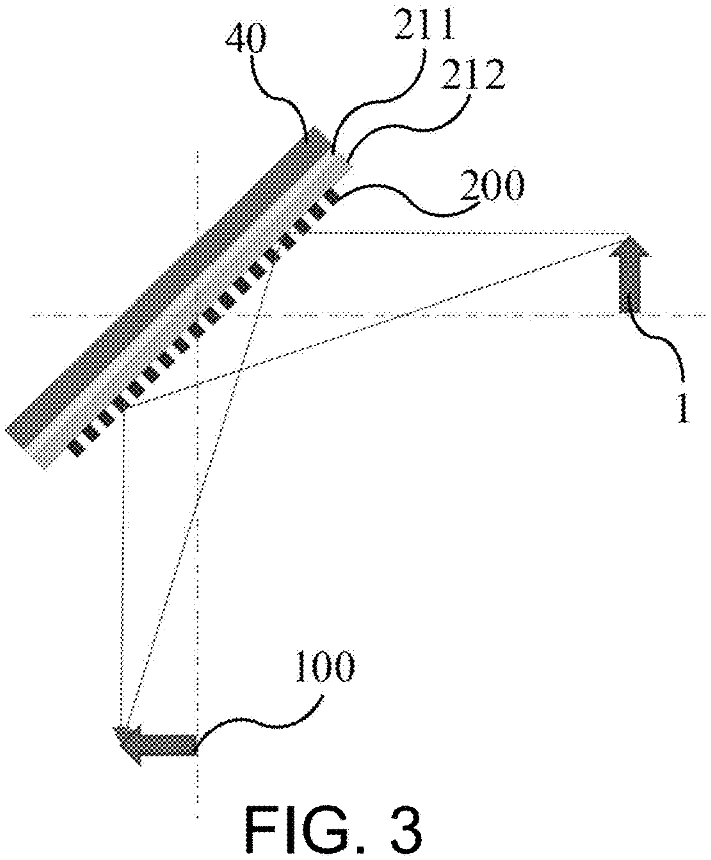
FIG. 3 schematically shows a third structure of a relay redirector according to an embodiment of the present disclosure.

Or, as shown in FIG. 3, the supporting part includes a supporting layer 40. The reflective metasurface 21 is provided on the supporting layer 40. Where, the reflective metasurface 21 is arranged on a side of the supporting layer 40 to which the incident imaging light is directed. For example, the reflective metasurface 21 is provided between the supporting layer 40 and image source 1. After the imaging light hits the reflective metasurface 21, the imaging light is quasi-reflected by the reflective metasurface 21 and forms the real image 100. The supporting layer 40 is mainly configured to support the reflective metasurface 21. The supporting layer 40 may be made of transparent materials or other non-transparent materials, and the present embodiment is not limited thereto.

Since the metasurface (such as the reflective metasurface 21) is thin in thickness and small in volume, the relay substrate 10 or the supporting layer 40 severs as a main structure of the relay redirector. Thus, the relay redirector of the present embodiment is small in volume and light-weighted, being suitable for more application scenarios.

Based on any of the above embodiments, as shown in FIG. 2, the metasurface includes a transmissive metasurface 22 and a reflective element 30. The transmissive metasurface 22 includes a plurality of transmissive unit cells that are capable of providing a modulation phase. The transmissive unit cells are used to transmit at least part of incident light hitting the transmissive unit cells. Outgoing light passing through the transmissive metasurface 22 forms the real image. The reflective element 30 is configured to reflect the incident light hitting the reflective element 30 to the light-outgoing side of the metasurface. In the present embodiment, the transmissive metasurface 22 and the reflective element 30 respectively realize the functions of phase modulation and light reflection.

In the present embodiment, the transmissive metasurface 22 includes a plurality of transmissive unit cells, which means that the transmissive metasurface 22 is abstractively divided into a plurality of transmissive unit cells, which is not intended to limit the plurality of transmissive unit cells to be completely independent of each other in structure. For example, the plurality of transmissive unit cells may be in one piece, or, at least a part of transmissive unit cells are independent in structure. In an embodiment, different transmissive unit cells are arranged on a same substrate. Optionally, different transmissive unit cells are arranged at different positions of the same substrate. Respective transmissive unit cells are partial structures obtained by conceptually partitioning the transmissive metasurface 22.

Optionally, as shown in FIG. 2, the transmissive metasurface 22 is configured to transmit the incident light hitting the transmissive metasurface 22 to the reflective element 30. The reflective element 30 is configured to reflect light passing through the transmissive metasurface 22 to the light-outgoing side of the metasurface. As shown in FIG. 2, the transmissive metasurface 22 is located between the image source 1 and the reflective element 300. The imaging light emitted from the image source 1 firstly passes through the transmissive metasurface 22. After the transmissive metasurface 22 modulates the imaging light, the modulated imaging light passes through the transmissive metasurface 22 and travels towards the reflective element 30. The reflective element 30 reflects the imaging light to the preset area and forms the real image 100.

Figure 4:
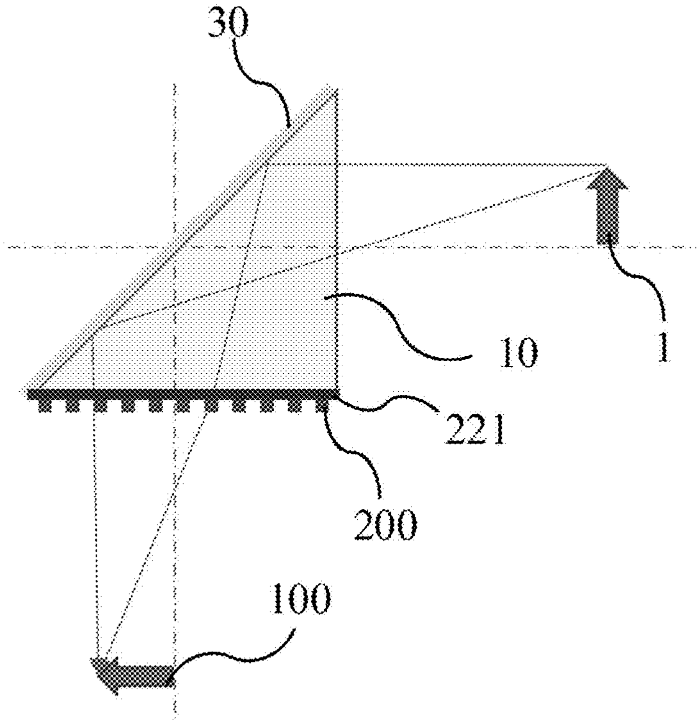
FIG. 4 schematically shows a fourth structure of a relay redirector according to an embodiment of the present disclosure.

Or, as shown in FIG. 4, the reflective element 30 is configured to reflect the incident light hitting the reflective element 30 to the transmissive metasurface 22. The transmissive metasurface 22 is configured to transmit the light reflected by the reflective element 30 to the light-outgoing side of the metasurface. Referring to FIG. 4, the image source 1, the transmissive metasurface 22 and the reflective element 300 are not collinear. The imaging light emitted from the image source 1 firstly reaches the reflective element 30 and the reflective element 30 reflects the imaging light to the transmissive metasurface 22, and then the transmissive metasurface 22 modulates the imaging light reflected by the reflective element 30 to form the real image 100.

In the case where the metasurface includes the transmissive metasurface 22, the supporting part may include the relay substrate 10, which is made of a transparent material, for example, being a material that is transmissive to visible light, such as glass. The relay substrate includes a light-entering surface and a light-outgoing surface 13; the light-entering surface is able to transmit incident light; and the light-outgoing surface 13 is able to transmit outgoing light. In addition, the relay substrate 10 also includes a reflective surface 12 configured to enable a light-reflecting element to be arranged thereon. In an embodiment as shown in FIG. 2 and FIG. 4, a right side of the relay substrate 10 is the light-entering surface 11; a lower side of the relay substrate 10 is the light-outgoing surface 13; and an upper side of the relay substrate 10 is the reflective surface 12.

Where, in order to form a complete optical path, at least a part of the light-entering surface 11 and at least a part of the light-outgoing surface 13 are located on the same side of the reflective surface 12, and the reflective surface 12 is configured to enable the light-reflecting element to be arranged thereon. Referring FIG. 2 or FIG. 4, the reflective metasurface 21 is arranged on the reflective surface 12. In the present embodiment, the relay substrate 10 may be a prism. FIG. 2 illustratively shows a triangular prism, which is only an embodiment of the relay substrate 10.

Moreover, as shown in FIG. 2 or FIG. 4, the transmissive metasurface 22 is arranged on the light-entering surface 11 of the relay substrate 10, or arranged on the light-outgoing surface 13 of the relay substrate 10. As shown in FIG. 2, the transmissive metasurface 22 is arranged at the light-entering surface 11 of the relay substrate 10. The imaging light, such as the imaging light emitted from the image source 1, is able to pass through the transmissive metasurface 22 at the light-entering surface 11 of the relay substrate 10. The transmissive metasurface 22 modulates the phase of the imaging light, so as to form the real image. In addition, the imaging light passing through the transmissive metasurface 22 propagates towards the reflective element 30 arranged on the reflective surface 12. Then, the reflective element 30 reflects the imaging light. Next, the reflected imaging light propagates towards the light-outgoing surface 13 and passes through the light-outgoing surface 13. The imaging light is capable of focusing outside the light-outgoing surface 13, thereby forming the real image 100. In FIG. 4, the transmissive metasurface 22 is arranged on the light-outgoing surface 13 of the relay substrate 10. The working principle thereof is similar to that in the above-mentioned embodiments corresponding to FIG. 2, and the details thereof will not be repeated herein.

Since the metasurface (such as the transmissive metasurface 22) is thin in thickness and small in volume, the relay substrate 10 acts as a main structure of the relay redirector of the present embodiment. Thus, the relay redirector is light-weighted and small in volume, thereby being suitable for more application scenarios.

Where, the light-entering surface 11 of the relay substrate 10 is perpendicular to the light-outgoing surface 13 of the relay substrate 10. When a principal optic axis of incident light hitting the relay redirector is perpendicular to the light-entering surface 11 of the relay substrate 10 and meanwhile a principal optic axis of outgoing light leaving the relay redirector is perpendicular to the light-outgoing surface 13 of the relay substrate 10, the refraction effect of the relay substrate 10 is reduced. Although light refraction occurs when light enters or leaves the relay substrate 10 that has the refractive index being greater than 1, the refraction effect of the relay substrate 10 is not considered in FIG. 1 to FIG. 4, for convenience of description.

Optionally, the transmissive metasurface 22 is provided with a transmissive reference position, which is coplanar with the transmissive metasurface 22. The transmission reference position may be a certain position on the transmissive metasurface 22, such as a center of the transmissive metasurface 22; or, the transmission reference position may also be arranged outside the transmissive metasurface 22, but be coplanar with the transmissive metasurface 22. It is common to select a certain position on the transmissive metasurface 22 as the transmission reference position. The transmissive unit cells in the transmissive metasurface 22 adjust the propagation direction of the transmitted light based on the transmission reference position, so that a first deflection angle of the incident imaging light entering the transmissive unit cells relative to the transmission reference position is larger than a second deflection angle of the outgoing imaging light passing through the transmissive unit cells relative to the transmission reference position. The transmitted light is capable of forming the real image.

In the present embodiment, the transmissive unit cells modulate the phase of the imaging light when the imaging light passes through the transmissive unit cells, so as to adjust a propagation direction of outgoing imaging light leaving the transmissive unit cells. Whereby, the light passing through the transmissive unit cells tends to be closer to the transmission reference position, when being compared to the incident imaging light entering the transmissive unit cells. That is, the transmitted light is more inclined to the transmission reference position, when being compared to the incident light.

As shown in FIG. 2, the transmission reference position is located in a middle of the transmissive metasurface 22 (it is seen in FIG. 2 that a transverse dash-dotted line passes through the transmissive metasurface 22 and the transverse dash-dotted line may act as the principal optic axis of the transmissive metasurface 22). After being modulated by the transmissive metasurface 22, the transmitted light is closer to the transmission reference position. Additionally, in order to form the real image, for example, forming the real image 100 after light reflection by the reflective element 30, an included angle is positively correlated to a distance from respective transmissive unit cells to the transmission reference position, where the included angle refers to an angle between the transmitted light and incident light entering the transmissive unit cells at different positions along the same incident direction. That is, when the transmissive unit cells are farther away from the transmission reference position, the degree of the modulation effect of the transmissive unit cells to the incident light is greater. In other words, the included angle between the incident light and the transmitted light is larger.

The present embodiment is described based on the deflection angle of a light propagation direction (an incident direction or a transmissive direction) relative to the transmission reference position. Specifically, a first deflection angle refers to a deflection angle of the incident light entering the transmissive unit cells relative to the transmission reference position; and a second deflection angle refers to a deflection angle of the outgoing imaging light passing through the transmissive unit cells relative to the transmission reference position. Where, a deflection angle of a light propagation direction relative to the transmission reference position refers to an included angle between the light propagation direction and a direction from the transmissive unit cell where the incident light enters to the transmission reference position. For example, for a light beam entering a transmissive unit cell M, a first deflection angle thereof refers to an included angle between the incident direction and a direction from the transmissive unit cell M to the transmission reference position.

Since the transmitted light tends to be closer to the transmission reference position, the second deflection angle is less than or equal to the first deflection angle. Additionally, for respective transmissive unit cells positioned differently, in the case that respective first deflection angles are the same, if a distance between a transmissive unit cell and the transmission reference position is smaller, the modulation effect of the transmissive unit cell to the light is weaker, that is, an included angle between the incident direction and the outgoing direction (i.e., a difference between the first deflection angle and the second deflection angle) is smaller.

Figure 5:
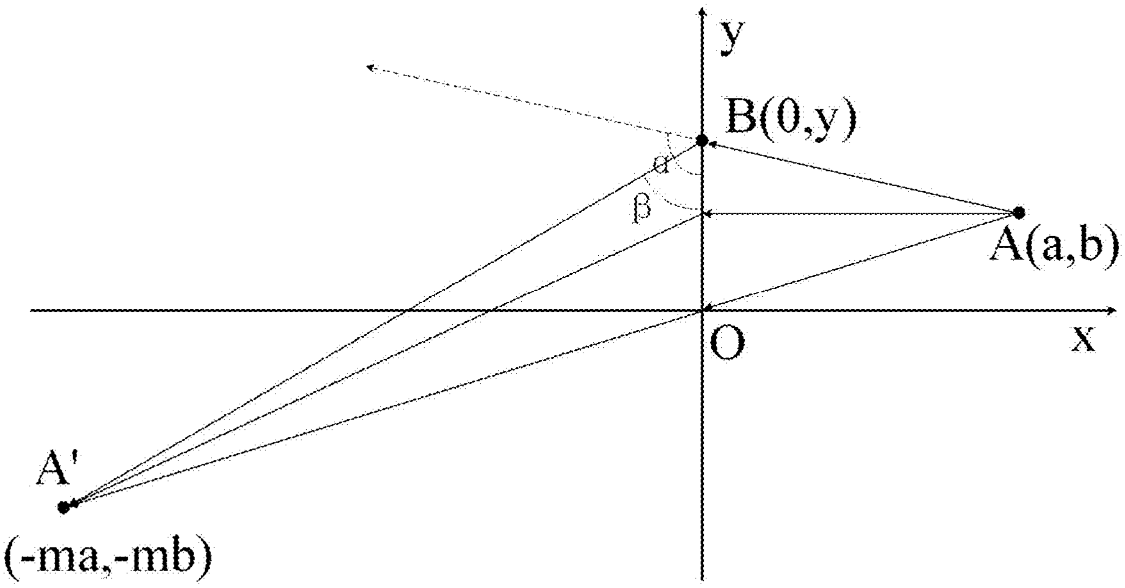
FIG. 5 is a schematic diagram showing the imaging principle of a transmissive metasurface according to an embodiment of the present disclosure.

In the present embodiment, the transmission reference position corresponds to the principal optic axis of the transmissive metasurface 22. The principal optic axis is generally perpendicular to a plane where the transmissive metasurface 22 is located. Therefore, a coordinate system is established based on the transmissive metasurface 22 and the principal optic axis. Referring to FIG. 5, the transmission reference position of the transmissive metasurface 22 acts as an origin O of the coordinate system. A line coincident with the transmissive metasurface 22 is a y-axis of the coordinate system. The principal optic axis passing through the transmission reference position O is an x-axis of the coordinate system. Where, for light passing through the transmission reference position O, an incident direction thereof is the same as an outgoing direction thereof. A certain pixel point of the image source 1 is marked as a pixel point A. Coordinates of the pixel point A are (a, b). Since a propagation direction of light passing through the transmission reference position O remains unchanged before and after the transmission, it is required to ensure that a real image A' formed by the pixel point A of the image source 1 is located in the direction of the incident light AO, and also ensure that the pixel point A and the real image A' are oppositely located on two sides of the transmissive metasurface 22, so as to form the real image. Coordinates of the real image A' are (−ma, −mb), if the real image is m times larger than the original image. In general, m>1, that is, the metasurface is used to form an enlarged real image.

Taking a transmissive unit cell B on the transmissive metasurface 22 shown in FIG. 5 as an example for the explanation purpose, coordinates of the transmissive unit cell B are (0, y), thus, light propagating from the pixel point A to the transmissive unit cell B is marked as light AB, and an incident direction of the light AB is $\overrightarrow{AB}$; in order to form the real image, the transmitted light obtained after the light AB passes through the transmissive unit cell B needs to reach the real image A', so, a propagation direction of the transmitted light may be expressed as $\overrightarrow{BA'}$.

Based on coordinates of the point A, the point B and the point A', there are the following equations: $\overrightarrow{AB}$=(−a, y−b), $\overrightarrow{BA'}$=(−ma,−mb−y), and a direction from the transmissive unit cell B to the transmission reference position O is expressed as $\overrightarrow{BO}$=(0,−y). As shown in FIG. 5, an included angle between $\overrightarrow{AB}$ and $\overrightarrow{BO}$ is α, that is, the first deflection angle is α; an included angle between $\overrightarrow{BA'}$ and $\overrightarrow{BO}$ is β, that is, the second deflection angle is β; an included angle between $\overrightarrow{AB}$ and $\overrightarrow{BA'}$ is α−β, and α≥β.

Based on the above, the following formula is obtained:

$$\cos\beta = \frac{\overrightarrow{BO} \cdot \overrightarrow{BA'}}{|\overrightarrow{BO}| \times |\overrightarrow{BA'}|} = \frac{-yx(-mb-y)}{\sqrt{y^2} \times \sqrt{m^2a^2 + (-mb-y)^2}}$$

when y is greater than 0, y represents a distance from the transmissive unit cell B to the transmission reference position O. If y+mb>0, then $$\cos\beta = \frac{1}{\sqrt{\frac{m^2a^2}{(mb+y)^2} + 1}}.$$

The formula obtained herein is applicable to any light propagating from the point A (a, b) to any transmissive unit cell B (0, y) whose y value meets conditions of y+mb>0 and y>0. Transmissive unit cells at different positions may have different y values. For incident light from the same pixel point, the transmissive unit cells at different positions deflect the incident light to different degrees, so the obtained second deflection angles are different. For example, the determination of the pixel point A means fixed values of a and b. According to the above formula, when a distance y between the transmissive unit cell B and the transmission reference position O is greater, a value of cos β is larger, which means that the second deflection angle β is smaller since the value of the cosine function monotonically decreases from 1 to −1 as θ increases from 0 to π.

In addition, for the transmissive unit cells at different positions, in the case that the first deflection angles of the incident light are the same, an incident direction of the incident light is parallel to $\overrightarrow{AB}$, as shown in the coordinate system of FIG. 5. Thus, when incident light emitted from the pixel point (a, b+Δd) propagates towards a transmissive unit cell at (0, y+Δd), the incident light is parallel to the light beam AB of FIG. 5, and both of the incident light and the light beam AB have the same first deflection angle. Where, Ad represents an offset of the distance. Therefore, when incident light with a first deflection angle of a passes through the transmissive unit cell at (0, y+Δd), a cosine value of the second deflection angle of the transmitted light is shown as follows:

$$\frac{1}{\sqrt{\frac{m^2a^2}{(m(b+\Delta d)+(y+\Delta d))^2} + 1}},$$

that is:

$$\frac{1}{\sqrt{\frac{m^2a^2}{(mb+y+(m+1)\Delta d)^2} + 1}}.$$

Since m>0, if Ad is positive, it is deducted that the transmissive unit cell at (0, y+Δd) is farther from the transmission reference position, compared with the transmissive unit cell at (0, y); and a cosine value of the second deflection angle of the transmissive unit cell at (0, y+Δd) is greater than a cosine value of the second deflection angle of the transmissive unit cell at (0, y). Since the value of the cosine function monotonically decreases from 1 to −1 as θ increases from 0 to π, the second deflection angle of the transmissive unit cell at (0, y+Δd) is smaller than the second deflection angle of the transmissive unit cell at (0, y). That is, in the case that the first deflection angles are the same, the second deflection angle of the transmissive unit cell at (0, y+Δd) is smaller than that of the transmissive unit cell at (0, y). In other words, when the transmissive unit cell is farther from the transmission reference position, the degree of deflection of light by the transmissive unit cell (i.e., the difference α−β between the first deflection angle and the second deflection angle) is greater.

To sum up, for the transmissive unit cell being farther from the transmission reference position, the second deflection angle thereof is smaller when the incident light emitted from the same pixel point passes through the transmissive unit cell, at the same time, the second deflection angle thereof is smaller when the incident light having the same first deflection angle passes through the transmissive unit cell. Analogously, the above conclusion is also attainable when y+mb<0 or y<0, and the detailed derivation will not be repeated herein. Whereby, the transmissive metasurface 22 is capable of forming the real image.

It is understandable to those skilled in the art that FIG. 5 only shows a cross-section of the transmissive metasurface 22 where the principal optic axis of the transmissive metasurface 22 resides. However, the transmissive metasurface is three-dimensional. Thus, in the case that the incident light is not coplanar with the principal optic axis, even if the incident direction is not parallel to the direction $\overrightarrow{AB}$ shown in FIG. 5, the first deflection angle of the incident light may still be equal to the first deflection angle of the incident light in FIG. 5.

In addition, optionally, as for a certain transmissive unit cell at a fixed distance from the transmission reference position and as for at least part of incident light passing through the certain transmissive unit cell, a difference between a cotangent value of the second deflection angle and a cotangent value of the first deflection angle is a constant value; and the constant value is positively correlated to a distance between the certain transmissive unit cell and the transmission reference position.

Referring to FIG. 5, a direction $\overrightarrow{BA'}$ (i.e., the propagation direction of the outgoing light passing through the transmissive unit cell B) may be expressed as follows: $\overrightarrow{BA'}=(-ma,-mb-y)$ where the direction $\overrightarrow{BA'}$ may also be expressed as follows:

$$\overrightarrow{BA'}=\left(-a,-\frac{y}{m}-b\right).$$

Supposing c=y−b, and $$d=-\frac{y}{m}-y,$$

the expression of the direction $\overrightarrow{AB}$ is obtained as follows: $\overrightarrow{AB}=(-a, c)$; the expression of the direction $\overrightarrow{BA'}$ is obtained as follows: $\overrightarrow{BA'}=(-a,c+d)$, where (−a,c+d) may be representation of $\overrightarrow{BA'}$, when expressing the angle.

Based sum and difference identities of trigonometric functions $$\cot\alpha-\cot\beta=-\frac{\sin(\alpha-\beta)}{\sin\alpha\sin\beta},$$

the following is obtained:

$$(\cot\alpha-\cot\beta)^2=\frac{1-\cos^2(\alpha-\beta)}{(1-\cos^2\alpha)(1-\cos^2\beta)}=$$

$$\frac{1-\frac{\left(\overrightarrow{AB}\cdot\overrightarrow{BA'}\right)^2}{\left(|\overrightarrow{AB}|\times|\overrightarrow{BA'}|\right)^2}}{\left(1-\frac{\left(\overrightarrow{AB}\cdot\overrightarrow{BO}\right)^2}{\left(|\overrightarrow{AB}|\times|\overrightarrow{BO}|\right)^2}\right)\left(1-\frac{\left(\overrightarrow{BO}\cdot\overrightarrow{BA'}\right)^2}{\left(|\overrightarrow{BO}|\times|\overrightarrow{BA'}|\right)^2}\right)}=$$

$$\frac{\left(|\overrightarrow{AB}|\times|\overrightarrow{BA'}|\right)^2-\left(\overrightarrow{AB}\cdot\overrightarrow{BA'}\right)^2}{\left[|\overrightarrow{AB}|^2-\frac{\left(\overrightarrow{AB}\cdot\overrightarrow{BO}\right)^2}{|\overrightarrow{BO}|^2}\right]\left[|\overrightarrow{BA'}|^2-\frac{\left(\overrightarrow{BO}\cdot\overrightarrow{BA'}\right)^2}{|\overrightarrow{BO}|^2}\right]}$$

When using (−a,c+d) as the substitution of $\overrightarrow{BA'}$, and based on $\overrightarrow{AB}=(-a,c)$, and $\overrightarrow{BO}=(0,-y)$, the following is obtained:

$$(\cot\alpha-\cot\beta)^2=\frac{(a^2+c^2)(a^2+c^2+2cd+d^2)-(a^2+c^2+cd)^2}{\left[(a^2+c^2)-\frac{c^2y^2}{y^2}\right]\left[(a^2+c^2+2cd+d^2)-\frac{(c+d)^2y^2}{y^2}\right]}=$$

$$\frac{(a^2+c^2)^2+(a^2+c^2)(2cd+d^2)-(a^2+c^2)^2-2cd(a^2+c^2)-c^2d^2}{a^2\times a^2}=$$

$$\frac{(a^2+c^2)d^2-c^2d^2}{a^4}=\frac{d^2}{a^2}=\frac{(1+m)^2}{a^2m^2}y^2$$

Since 180°>α≥β>0 and the cotangent function decreases monotonically from 1 to −1 in this interval, a difference between the cotangent value cot β of the second deflection angle and the cotangent value cot β of the first deflection angle is not less than 0. That is $$\cot\beta-\cot\alpha=\left|\frac{1+m}{am}\right||y|,$$

where |y| represents a distance from the transmissive unit cell to the transmission reference position, i.e., a distance between the point B and the origin O as shown in FIG. 5. Since the magnification m of the image source 1 is preset and positions of the image source 1 and the transmissive metasurface 22 are fixed in actual working conditions, the distance |a| between the image source 1 and the transmissive metasurface 22 is fixed and a value of cot β−cot α is constant. Additionally, when the transmissive unit cell is farther from the transmission reference position O, the value of cot β−cot α is greater. On the other hand, the transmissive unit cells at different positions that meet the above conditions enable the transmitted light to pass through the corresponding real image as much as possible, in other words, the incident light emitted from the pixel point A is capable of traveling towards the real image A, thereby improving the imaging performances of the transmissive metasurface 22.

Optionally, an optical axis of the imaging light emitted from the image source 1 is parallel to a principal optic axis of the transmissive metasurface 22. For example, in the case where the transmissive metasurface 22 is of a planar structure, the image source 1 may be parallel to the transmissive metasurface 22. By setting the optical axis of the imaging light emitted by the image source 1 parallel to the principal optic axis of the transmissive metasurface 22, it is feasible to design the transmissive metasurface 22 to be symmetrical, thereby facilitating the design and the fabrication of the transmissive metasurface 22.

Optionally, the modulation phase provided by the transmissive unit cells of the transmissive metasurface 22 is expressed as follows:

$$\varphi(r,\lambda_i)=\frac{2\pi}{\lambda_i}\sum_j a_{i,j}r^{2j},\ j=1,2,\ldots,N;$$

where, r is a radial coordinate of respective transmissive unit cells, for example, r represents the distance from the respective transmissive transmissive unit cells to the transmission reference position; $\lambda_i$ is an i-th wavelength that needs to be adjusted, $a_{i,j}$ is a preset j-th phase coefficient corresponding to the i-th wavelength, and N is a positive integer and is not less than 3.

In the present embodiment, the transmissive unit cells in the transmissive metasurface 22 are rotationally symmetrical, and a symmetry center thereof is located at the transmission reference position. $\lambda_i$ is a wavelength within the wave band that needs to be adjusted, such as a wavelength in the visible spectrum. The phase coefficient $a_{i,j}$ is obtainable by an optimization algorithm. The optimization objective is to project the real image generated by the relay redirector into the preset area and minimize the distortion of the projected real image as much as possible, so that an intermediate image plane is formed in the preset area.

Optionally, phase errors of the metasurface unit cells at a plurality of target wavelengths that need to be adjusted meet a minimum error condition. Where, respective phase errors refer to a difference between an actual compensation phase provided by the metasurface unit cells at the target wavelengths and a theoretical compensation phase required to be provided by the metasurface unit cells at the same target wavelengths.

In the present embodiment, a structural database containing the plurality of transmissive unit cells may be preset. The structural database may be an existing database, or a new database obtained by adaptively adding new transmissive unit cells in the existing database. The modulation effect of a certain transmissive unit cell is generally different for light with different wavelengths. The modulation effect of different transmissive unit cells in the structural database on light of the same wavelength is also different. In the present embodiment, the target wavelength is a wavelength that needs to be adjusted. The target wavelength may include wavelengths in the visible spectrum. Based on positions of the transmissive unit cells, etc., it is feasible to determine in advance a phase that needs to be adjusted for light at each target wavelength, that is, determining the theoretical phase. Moreover, based on the structural database, it is also feasible to determine a modulation phase of each transmissive unit cell to be adjusted for light of different target wavelengths, that is, determining the actual modulation phase. In the present embodiment, a difference between the theoretical phase and the actual modulation phase at the same target wavelength is used as a phase difference value at the target wavelength. If phase errors of a certain transmissive unit cell at multiple target wavelengths meet the minimum error condition, it means that there is not much difference between the modulation effect of the phase of the transmissive unit cell and the modulation effect of the theoretical phase that needs to be adjusted. In this case, the transmissive unit cell may be selected as a corresponding transmissive unit cell in a modulation element 200.

Optionally, the minimum error condition is satisfied when a weighted sum $$\Delta_n^r$$

of the phase errors is minimum. That is, the obtained weighted sum $$\Delta_n^r$$

of the phase errors is the smallest, for the selected transmissive unit cells in the modulation element 200, when compared with other transmissive unit cells in the structural database. In the present embodiment, the weighted sum of the phase errors is expressed as follows:

$$\Delta_n^r = \sum_j c_j |\varphi_{the}(r, \lambda_i) - \varphi_n(r, \lambda_i)|;$$

where, r is a radial coordinate of respective transmissive unit cells, for example, r represents the distance from the respective transmissive unit cells to the transmission reference position, thus, r may be used to represent the respective transmissive unit cells at different positions; n is a serial number of the transmissive unit cell at the radial coordinate r in the structural database; $\lambda_i$ is an i-th wavelength; $c_i$ is a weight coefficient of the target wavelength $\lambda_i$; $\varphi_n(r, \lambda_i)$ is the actual modulation phase of an $n^{th}$ transmissive unit cell at the target wavelength $\lambda_i$; and $\varphi_{the}(r,\lambda_i)$ is the theoretical phase of the transmissive unit cell at the radial coordinate r that needs to be adjusted at the target wavelength $\lambda_i$. For example, as mentioned above, the theoretical phase may be:

$$\varphi(r, \lambda_i) = \frac{2\pi}{\lambda_i} \sum_j a_{i,j} r^{2j}, \; j = 1, 2, \ldots, N.$$

In the present embodiment, for any transmissive unit cell k ($k \in A$) in the structural database A, it is able to determine the actual modulation phase of the transmissive unit cell k at the corresponding target wavelength $\lambda_i$. In other words, it is able to determine the actual modulation phase $\varphi_k(r,\lambda_i)$ of the transmissive unit cell K at the radial coordinate r, as well as the weighted sum $$\Delta_k^r$$

of multiple phase errors. Furthermore, the transmissive unit cell n corresponding to the smallest weighted sum is determined. That is, for any k, $$\Delta_n^r \leq \Delta_k^r.$$

Therefore, the transmissive unit cell n in the structural database is used as the transmissive unit cell at the radial coordinate r. Transmissive unit cells at other positions of the transmissive metasurface 22 can be determined in the same way. Details thereof will not be repeated herein.

Where, corresponding weight coefficients $c_i$ are set for different target wavelengths $\lambda_i$. Optionally, the target wavelengths at least include wavelengths corresponding to yellow light, green light, red light, and purple light. In addition, the smaller value of the weight coefficients of the yellow light and the green light is not less than the larger value of the weight coefficients of the red light and the purple light. That is, the yellow light and the green light have larger weight coefficients, whereas, the red light and the purple light have smaller weight coefficients. The transmissive unit cell determined based on the weighted sum is able to better adjust the yellow light and the green light to which the human eye is more sensitive, thereby improving the viewing experience of the human eye.

Figure 6:
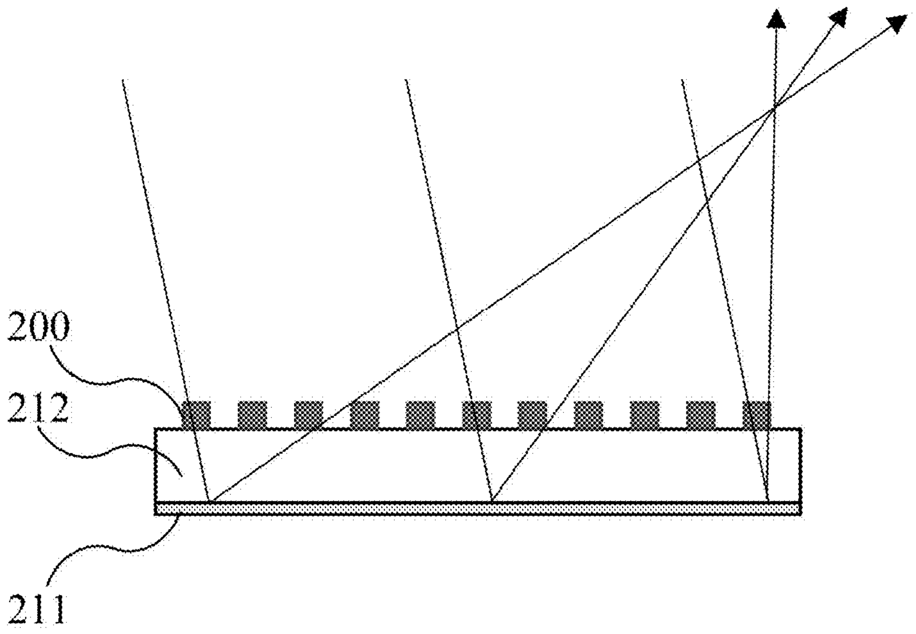
FIG. 6 schematically shows a first structure of a reflective metasurface according to an embodiment of the present disclosure.

Based on any of the above embodiments, as shown in FIG. 3 and FIG. 6, the reflective metasurface 21 includes a reflective layer 211, a second transparent substrate layer 212 and a plurality of nanostructures 200. The reflective layer 211 and the second transparent substrate layer 212 are adhered to each other. The second transparent substrate layer 212 is arranged on a side of the reflective layer 211 close to the light-entering side and the light-outgoing side of the metasurface. The plurality of nanostructures 200 are arranged on a side of the second transparent substrate layer 212 away from the reflective layer 211. For example, the plurality of nanostructures 200 are arranged on a side of the reflective layer 211 close to the image source 1. Where, the light-entering side of the metasurface is a side configured for light entering, for example, being a side where the light-entering surface 11 of the relay substrate 10 is located; the light-outgoing side of the metasurface is a side configured for light outgoing, for example, being a side where the light-outgoing surface 13 of the relay substrate 10 is located. Referring to FIG. 3 and FIG. 6, the second transparent substrate layer 212 is arranged on the side of the reflective layer 211 close to the image source 1. The plurality of nanostructures 200 are arranged on the second transparent substrate layer 212 and located on the side of the second transparent substrate layer 212 close to the image source 1.

Figure 7:
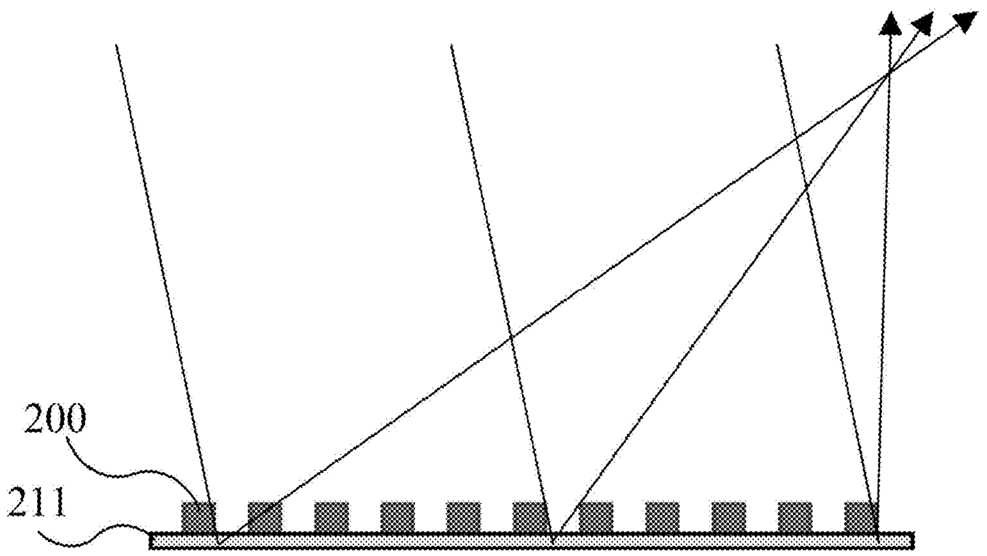
FIG. 7 schematically shows a second structure of a reflective metasurface according to an embodiment of the present disclosure.

Or, as shown in FIG. 7, the reflective metasurface 21 includes a reflective layer 211 and a plurality of nanostructures 200. The plurality of nanostructures 200 are arranged on a side of the reflective layer 211 close to the light-entering side and the light-outgoing side of the metasurface. By arranging the reflective metasurface 21 on the supporting part, the supporting part serves as a substrate of the reflective metasurface 21. For example, the reflective metasurface 21 is arranged on the reflective surface 12 of the relay substrate 10, and the reflective surface 12 of the relay substrate 10 serves as a substrate of the reflective metasurface 21.

In the present embodiment, the reflective metasurface 21 includes a reflective layer 211 which has high reflectivity for visible light. For example, the reflective layer 211 may have a thickness of 300-2000 nm and be a metal layer made of aluminum, silver, gold, chromium, etc. The nanostructures 200 are arranged between the reflective layer 211 and the image source 1. The nanostructures 200 are made of materials that are transparent in the visible spectrum, for example, being made of titanium oxide, silicon oxide, silicon nitride, gallium nitride, gallium phosphide, aluminum oxide or hydrogenated amorphous silicon. Optionally, a gap between the nanostructures 200 is filled with air or other filler materials that are transparent in the visible spectrum. Furthermore, a difference between the refractive index of the filler materials and the refractive index of the nanostructures 200 needs to be greater than or equal to 0.5.

The reflective metasurface 21 also includes a second transparent substrate layer 212 configured for the supporting purpose. As shown in FIG. 6, the second transparent substrate layer 212 is located between the reflective layer 211 and the nanostructures 200. In this case, the second transparent substrate layer 212 is required to be made of materials that are transparent in the visible spectrum; the materials of the second transparent substrate layer 212 are different from both of materials of the nanostructures 200 and the filler materials filled between the nanostructures 200. The materials of the second transparent substrate layer 212 may be quartz glass, crown glass, flint glass, etc. Alternatively, the second transparent substrate layer 212 is arranged on a back-lighting side of the reflective layer 211. Under this condition, the second transparent substrate layer 212 may be opaque or be transparent in the visible spectrum. The present disclosure is not limited thereto. Where, the reflective layer 211 may be a layer coated on a side of the second transparent substrate layer 212.

Figure 8:
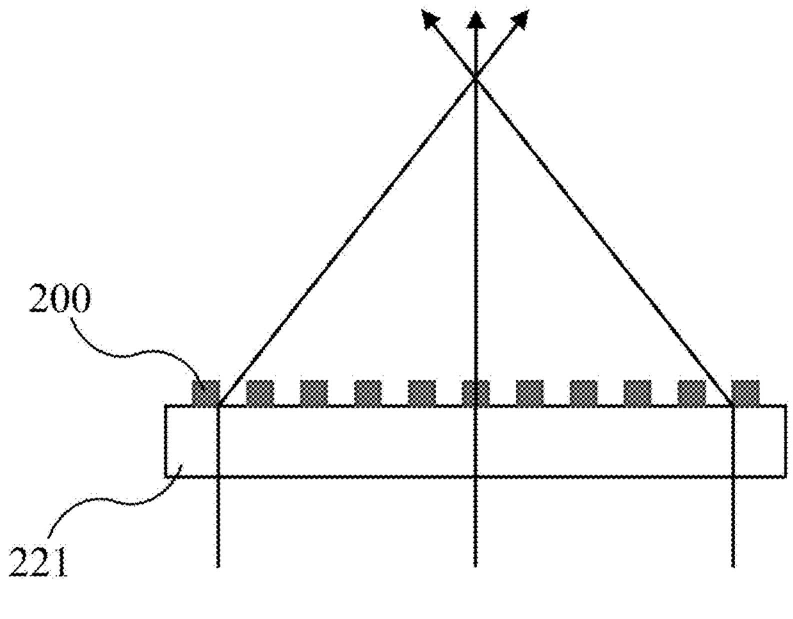
FIG. 8 is a structural diagram of a transmissive metasurface according to an embodiment of the present disclosure.

Optionally, in order to enable the imaging light to pass through the transmissive metasurface 22, materials of the transmissive metasurface 22 are transmissive to visible light. Referring to FIG. 8, the transmissive metasurface 22 includes a first transparent substrate layer 221 and a plurality of nanostructures 200 arranged on the first transparent substrate layer 221.

The first transparent substrate layer 221 is transparent in the visible spectrum, and materials of the first transparent substrate layer 221 may be quartz glass, crown glass, flint glass, etc. The nanostructures 200 are also transparent in the visible spectrum, and materials of the nanostructures 200 may be titanium oxide, silicon oxide, silicon nitride, gallium nitride, gallium phosphide, aluminum oxide, hydrogenated amorphous silicon, etc. Optionally, a gap between the nanostructures 200 may be filled with filler materials, and the filler materials may be air or other materials that are transparent in the visible spectrum. In addition, a difference between the refractive index of the filler materials and the refractive index of the nanostructures 200 needs to be greater than or equal to 0.5. Where, the first transparent substrate layer 221, the nanostructures 200, and the filler materials between the nanostructures 200 are different from each other in material.

Based on any of the above embodiments, the relay redirector is generally designed for imaging light, for example, the imaging light is emitted from the image source 1. The imaging light may be polarized light. In order to better modulate the polarized light, the nanostructures 200 may be of a structure sensitive to the polarized light (also referred to as a polarization-dependent structure). The polarization-dependent structure imposes a propagation phase on the incident light, which facilitates the design of the nanostructures 200 and lowers the design difficulties of the metasurface 20. In the present embodiment, the nanostructures 200 in both the reflective metasurface 21 and the transmissive metasurface 22 may be of a structure sensitive to the polarized light.

Figure 9:
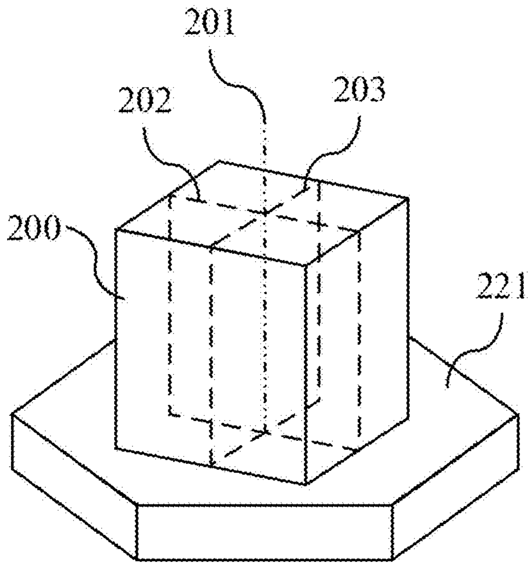
FIG. 9 is a structural diagram of a nanostructure in a relay redirector according to an embodiment of the present disclosure.

As shown in FIG. 9, a nanostructure 200 is of an upright structure with a central axis 201 in a height direction of the nanostructure 200; and the upright structure may be a pillar structure. The nanostructure 200 includes a first plane 202 and a second plane 203 that pass through the central axis 201 and that are perpendicular to each other. Intersection of the nanostructure 200 with the first plane 202 forms a first intersection line, and intersection of the nanostructure with the second plane 203 forms a second intersection line. The second intersection line does not coincide completely with the first intersection line after rotating 90° around the central axis 201.

As shown in FIG. 9, an intersection line of the first plane 202 and the second plane 203 is the central axis 201. The first intersection line and the second intersection line are represented by a dashed lines in FIG. 9. As for the nanostructure 200 which is polarization-dependent, one of the first intersection line and the second intersection line does not coincide completely with the other one of the first intersection line and the second intersection line after rotating 90° around the central axis 201. The nanostructure may be a square prism that is not a regular, for example, a cross-sectional shape of the nanostructure 200 on a plane perpendicular to the central axis 201 is rectangular. Or, the nanostructure 200 may be a prism with an odd number of lateral edges, for example, being a triangular prism, a pentagonal prism, etc. Or, the nanostructure 200 may be a prism with 4n+2 lateral edges (where n is a positive integer), for example, being a hexagonal prism, a decagon prism, etc. Or, the nanostructure 200 is an elliptical prism, etc.

FIG. 9 shows an example in which the nanostructure 200 is arranged on the first transparent substrate layer 221. The nanostructure 200 may also be arranged on the second transparent substrate layer 212. The present embodiment is not limited thereto. Moreover, FIG. 9 shows an unit cell which is conceptually divided. Taking a transmissive unit cell as an example, a shape of the first transparent substrate layer 221 corresponding to the transmissive unit cell may be different according to different dividing methods. In addition, the unit cell shown in FIG. 9 is only illustrative, and is not intended to limit the unit cell to have the dimension and the dimensional proportion as shown in FIG. 9. The unit cells with the required size may be designed or selected according to actual requirements.

Figure 10:
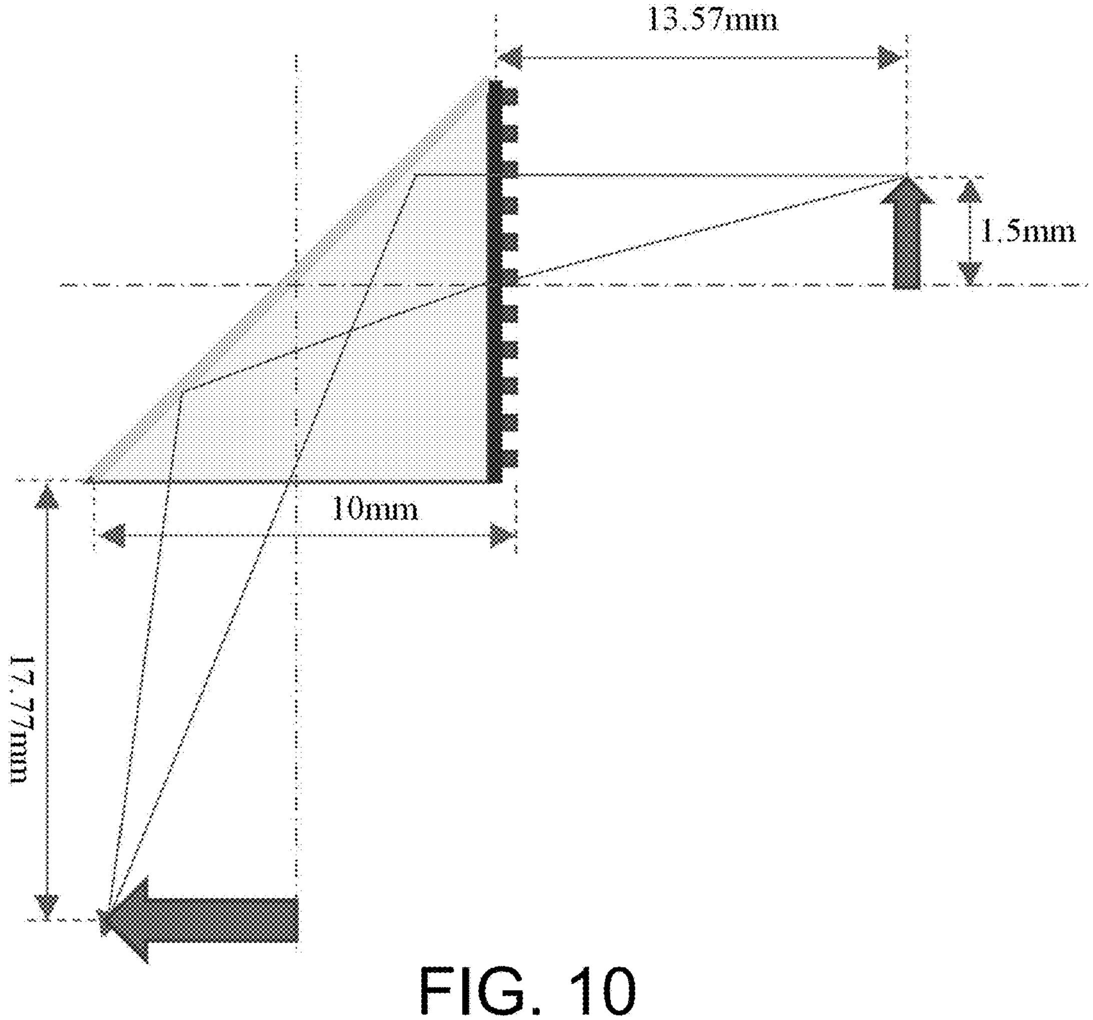
FIG. 10 shows structural details of a relay redirector according to an embodiment of the present disclosure.
Figure 11:
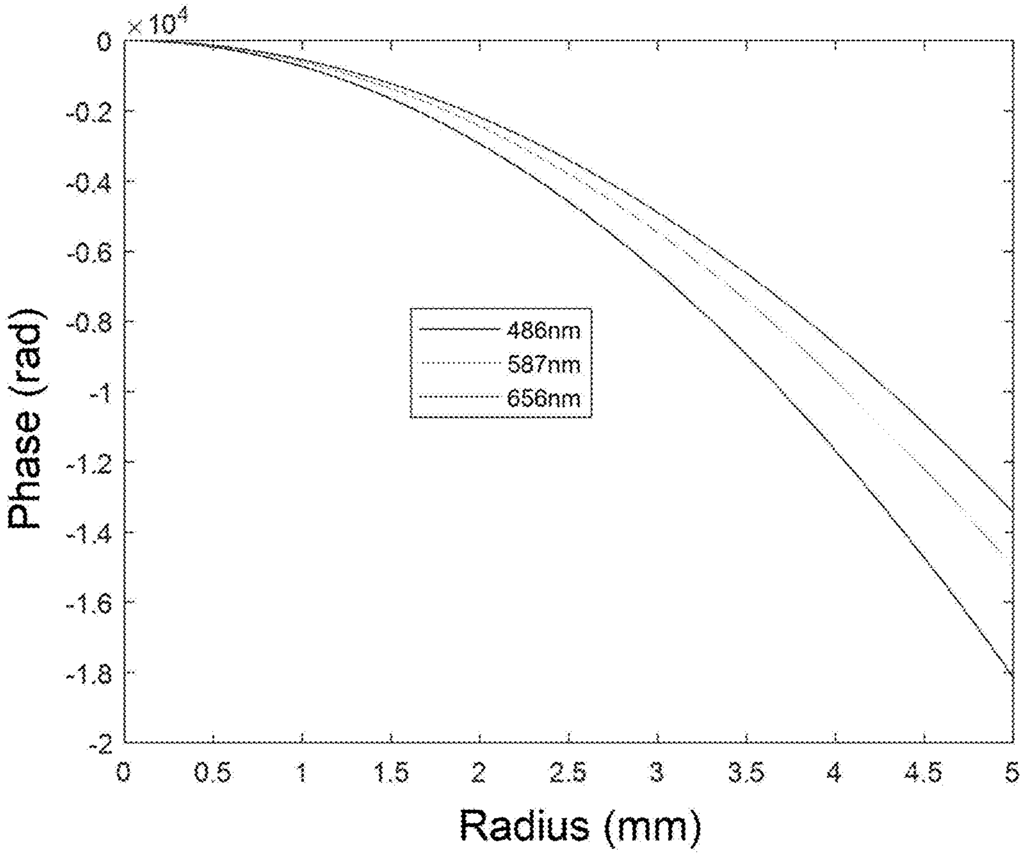
FIG. 11 is a phase curve diagram of a relay redirector according to an embodiment of an present disclosure.
Figure 12:
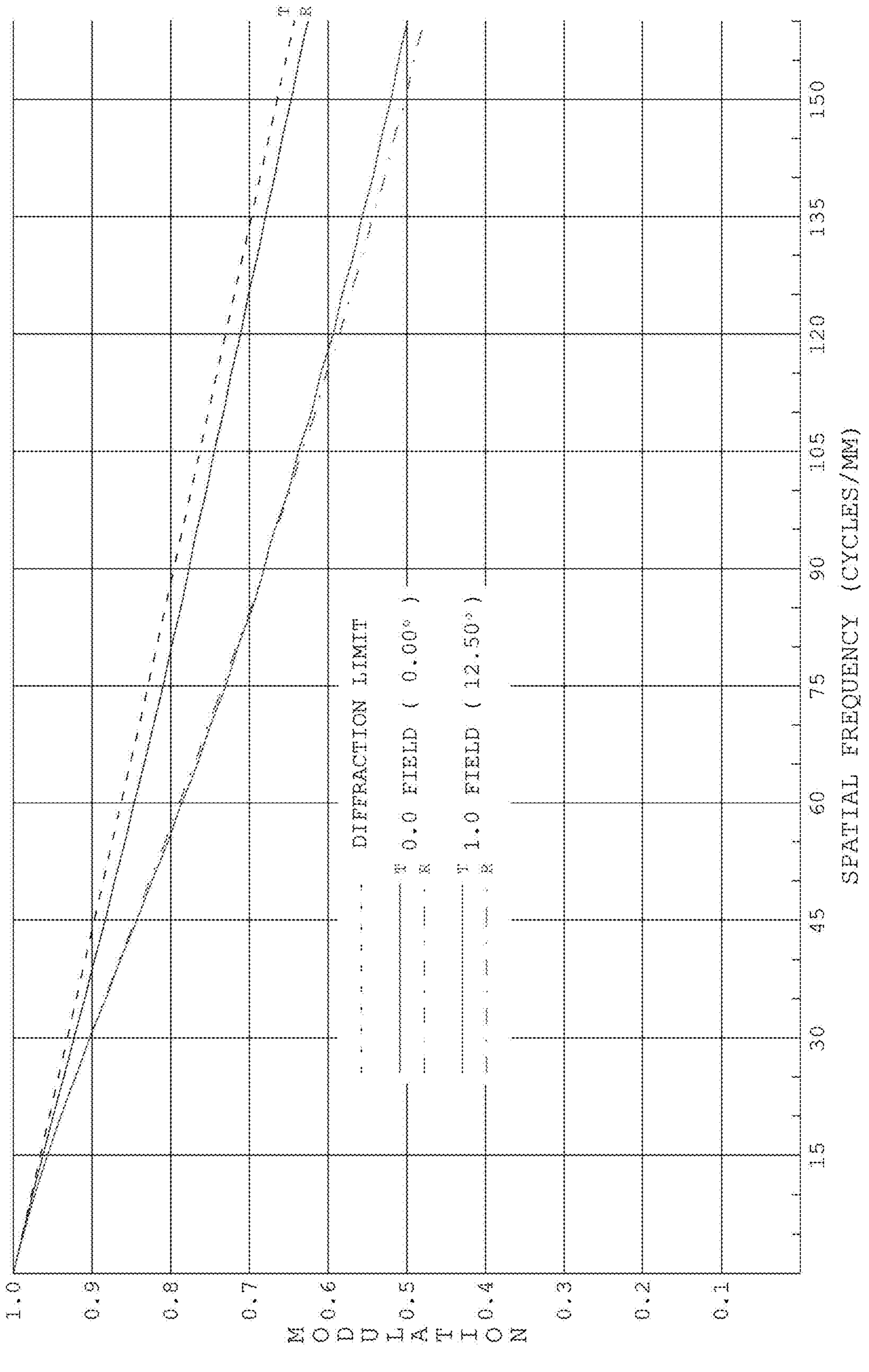
FIG. 12 shows a comprehensive modulation transfer function of a relay redirector according to an embodiment of the present disclosure.
Figure 13:
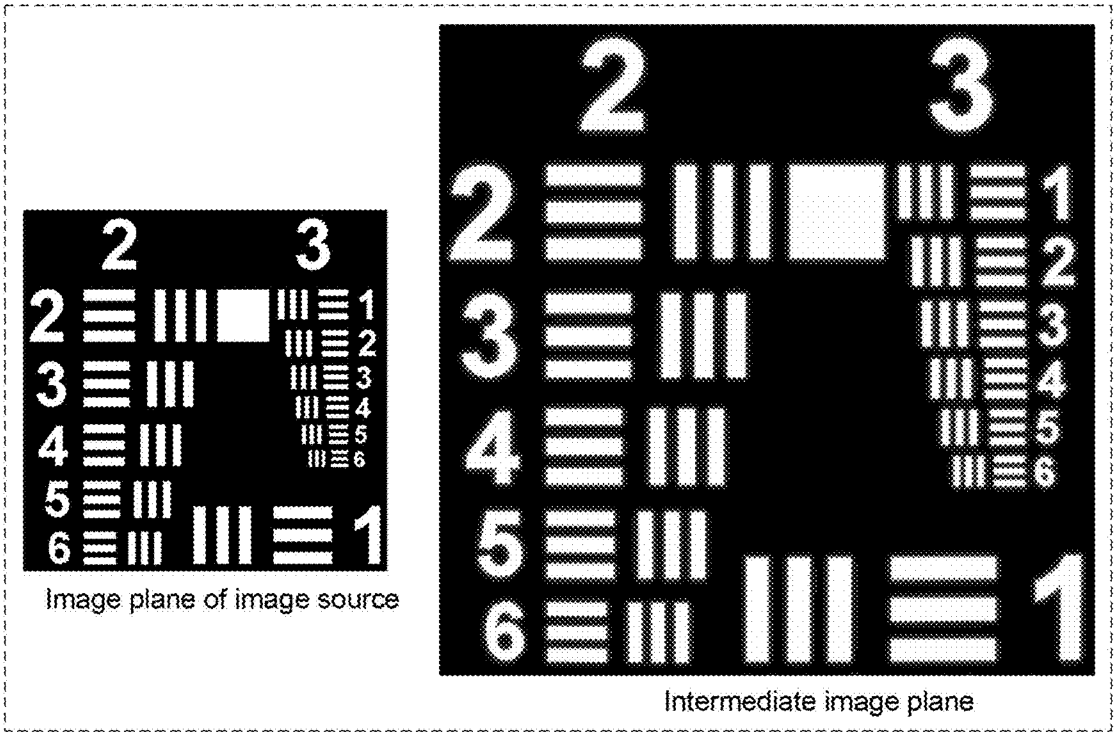
FIG. 13 is a projection simulation image of a relay redirector according to an embodiment of the present disclosure.

The present embodiment also provides structural details of the relay redirector. As shown in FIG. 10, the relay redirector includes a transmissive metasurface 22 arranged at the light-entering surface 11 of the relay substrate 10. Where, a pixel size of the image source 1 is 3 μm; a number of pixels is 800×600; and a diagonal length is 3 mm. The relay substrate 10 is a right angle prism used to redirect light. Side lengths of the light-entering surface 11 and the light-outgoing surface 13 are 10 mm. The image source 1 is placed at 13.57 mm away from the light-entering surface 11 of the relay substrate 10 (transmissive metasurface 22), and the formed real image (intermediate image plane) is located at 17.77 mm away from the light-outgoing surface, and the amplification factor m is equal to 1.8. In the transmissive metasurface 22, the second transparent substrate layer 221 is made of glass and has a thickness of 30 nm. Phase coefficients for determining the phase to be adjusted $\varphi(r, \lambda_i)$ are shown as follows: a1=−5.7143E-02; a2=6.5136E-05; a3=−2.7023E-06; a4=1.0899E-07; a5=−1.5714E-09. Phase curves, comprehensive modulation transfer functions and projection simulation images corresponding to 486 nm, 587 nm and 656 nm are respectively shown in FIG. 11, FIG. 12 and FIG. 13. Based on these drawings, it is seen that the relay redirector based on the metasurface provided in the present embodiment has advantages that the projection has small distortion and high resolution.

Figure 14:
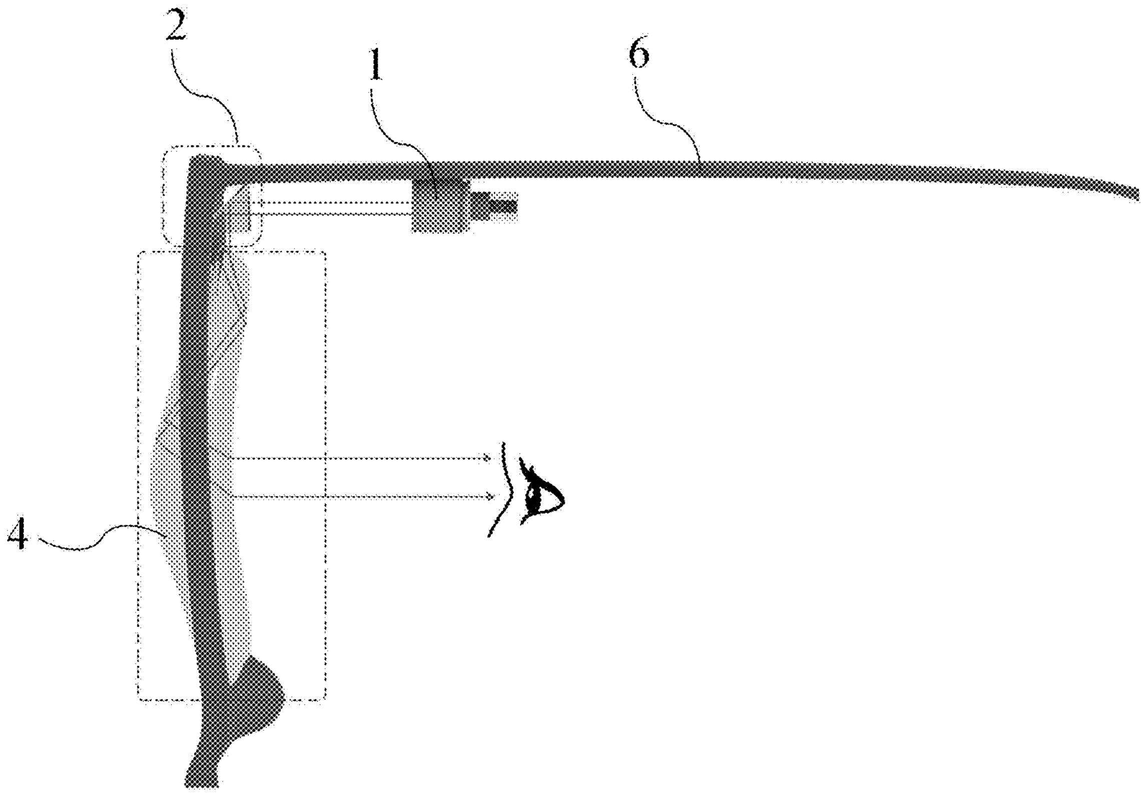
FIG. 14 schematically shows a structure of a display device according to an embodiment of the present disclosure.

Based on the same inventive concept, a display device is provided, as shown in FIG. 14. The display device includes an image combiner 4 and the relay redirector 2 as disclosed in any of the above embodiments. The relay redirector 2 is configured to generate a real image 100 on the light-entering side of the image combiner 4. The real image 100 is not shown in FIG. 14. The process of generating the real image 100 by the relay redirector 2 may be referred to the relevant descriptions in an embodiment as shown in FIG. 1. The image combiner 4 is used to direct the imaging light emitted from the real image 100 to an observation area, and the observation area may be a range of the eye movement (i.e., eyebox), so that human eyes in the observation area are able to observe the real image 100 formed by the relay redirector 2. As shown in FIG. 1, the display device may also include an image source 1. The image source 1 is configured to emit imaging light towards the relay redirector 2. The relay redirector 2 is configured to modulate the image formed by the image source 1 towards the light-entering side of the image combiner 4, thereby forming the real image 100 at the light-entering side of the image combiner 4.

In the display device provided in the present embodiment, the relay redirector 2 utilizes the metasurface to modulate the imaging light, so as to easily form the real image. Compared with the traditional relay lensing set, the use of the relay redirector 2 in the display device has significant advantages, for example, there is no need to stack a large number of optical components that are thick, which cuts down the number of the optical components, decreases the required volume for the projection light path, reduces the weight, lowers the difficulties of adjustment and assembly, and simplifies the system. Moreover, the relay redirector 2 is able to be mass-produced by semiconductor processes, which has benefits of the high production capacity, the simple manufacture process, the low cost, and the high yield and the reduced design difficulty.

Figure 15:
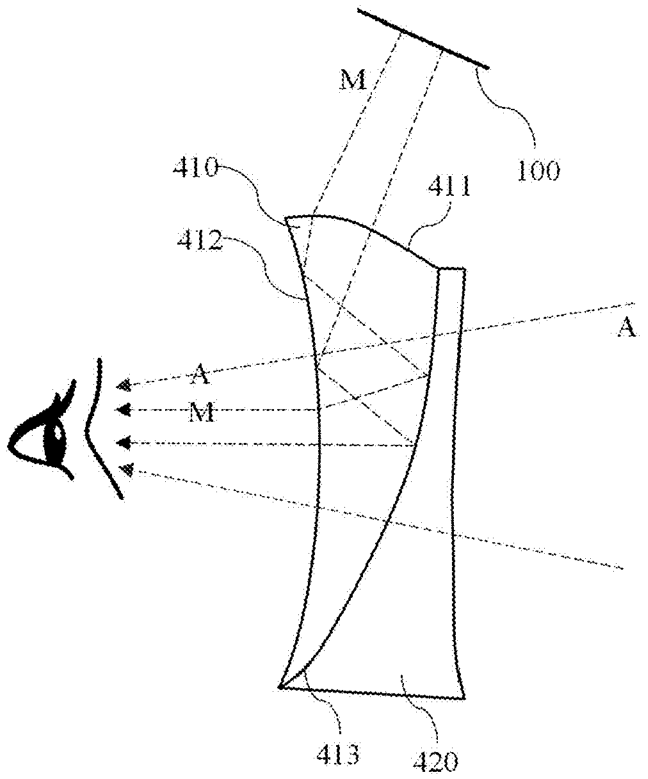
FIG. 15 schematically shows a first structure of an image combiner according to an embodiment of the present disclosure.

Based on any of the above embodiments, as shown in FIG. 15, the image combiner 4 includes a free-form prism 410 and a compensator 420. As shown in FIG. 15, the free-form prism 410 includes a transmissive surface 411, a transflective surface 412 and a light-splitting surface 413. The compensator 420 is provided on the light-splitting surface 413.

The transmissive surface 411 is configured to transmit the imaging light emitted by the real image 100 and direct the transmitted imaging light towards the transflective surface 412. The transflective surface 412 is configured to totally reflect the imaging light transmitted by the transmissive surface 411 to the light-splitting surface 413. The light-splitting surface 413 is configured to reflect the imaging light totally reflected by the transflective surface 412 to the transflective surface 412. The transflective surface 412 is also configured to transmit the imaging light reflected by the light-splitting surface 413. The compensator 420 is configured to compensate dioptric power of the free-form prism 410, so that the image combiner 4 is afocal.

In the present embodiment, the transmissive surface 411 is configured to transmit external imaging light. The imaging light transmitted by the transmissive surface 411 is directed to the transflective surface 412. Where, the imaging light transmitted by the transmissive surface 411 may be imaging light emitted from the real image 100 formed by the relay redirector 2. A position of the real image 100 may be inside the free-form prism 410, or outside the free-form prism 410. FIG. 15 illustratively shows the real image 100 being located outside the free-form prism 410, which is an example of the present disclosure. The transflective surface 412 is configured to totally reflect the imaging light transmitted by the transmissive surface 411 to the light-splitting surface 413. The light-splitting surface 413 is configured to reflect the imaging light totally reflected by the transflective surface 412 to the transflective surface 412. The transflective surface 412 is also configured to transmit the imaging light reflected by the light-splitting surface 413. The transflective surface 412 may be a concave spherical surface, which facilitates the manufacture process.

As shown in FIG. 15, the imaging light M emitted by the real image 100 is directed to the transmissive surface 411 of the free-form prism 410. The imaging light M passes through the transmissive surface 411 and hits the transflective surface 412 at a relatively large incident angle, and is totally reflected on the transflective surface 412, so that the imaging light M is totally reflected to the light-splitting surface. The light-splitting surface 413 has both transmissive and non-reflective characteristics. For example, the light-splitting surface 413 is provided with a partially transparent and partially reflective film, which is capable of reflecting at least part of the imaging light M. The imaging light M reflected by the light-splitting surface 413 finally hits the transflective surface 412 again at a relatively small incident angle, and then passes through the transflective surface 412 and travels to the human eye, so that the user can view the real image 100 formed by the relay redirector 2. At the same time, external ambient light A passes through the compensator 420, the light-splitting surface 413, and the transflective surface 412 and reaches the human eye, so that the user can also view the external environment.

Although the free-form prism 410 enables the user to view the real image 100, the optical path of the imaging light is different from the optical path of the external ambient light, which causes the presence of distortion when the external ambient light only passes through the free-form prism 410. Therefore, the compensator 420 is required to perform the compensation for the free-form prism 410, so that the image combiner 4 formed by the free-form prism 410 and the compensator 420 is an afocal system, and then there is no distortion when ambient light passes through the image combiner 4. Additionally, the compensator 420 does not affect the optical path of the imaging light and also does not have an influence on the user's viewing of the real image 100.

As shown in FIG. 15, the compensator 420 may be of a lens structure with a free-form surface, so as to achieve the compensation effects. However, since the lens structure itself has a certain thickness, a thickness of the image combiner 4 is greater than 8 mm. In an example, the thickness of the image combiner 4 is even greater than 10 mm.

Figure 16:
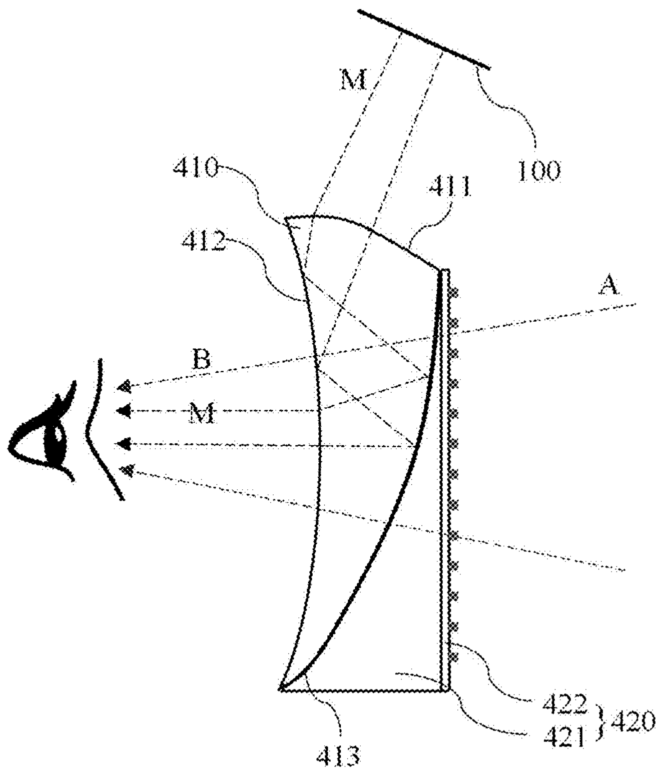
FIG. 16 schematically shows a second structure of an image combiner according to an embodiment of the present disclosure.

In order to reduce the thickness of the image combiner 4, as shown in FIG. 16, the compensator 420 includes a prism substrate 421 and a compensation element 422. The compensation element is configured to be divided into a plurality of metasurface unit cells. The compensation element 422 is provided on a side of the prism substrate 421. The metasurface unit cells of the compensation element 422 are configured to provide a compensation phase for light passing through the metasurface unit cells. A propagation direction of incident light traveling towards the compensator 420 is the same as a propagation direction of outgoing light obtained after the incident light sequentially passes through the metasurface unit cells, the prism substrate 421 and the free-form prism 410 arranged on a light-outgoing side of the prism substrate 421.

In the present embodiment, the prism substrate 421 is transmissive to the incident light hitting the prism substrate 421. Materials of the prism substrate 421 may be glass or other transparent materials. When it is required to compensate the ambient light, the prism substrate 421 has a light-entering side that incident ambient light hits and a light-outgoing side that outgoing ambient light leaves. As shown in FIG. 16, ambient light A is incident along a direction from right to left. Thus, a right side of the prism substrate 421 is the light-entering side thereof; and a left side of the prism substrate 421 is the light-outgoing side thereof. The compensation element 422 that is configured to realize the compensation effects is arranged on a side of the prism substrate 421. As shown in FIG. 16, the compensation element 422 is arranged on the light-entering side of the prism substrate 421.

The compensation element 422 is configured to be divided into a plurality of metasurface unit cells. Since a thickness of the metasurface unit cells is small, generally being micrometer-scale or nanoscale, the compensation element 422 is arranged on a side of the prism substrate 421, so that the prism substrate 421 serves for supporting the compensation element 422. As shown in FIG. 16, a side of the prism substrate 421 provided with the compensation element 422 is planar, which facilitates the manufacture process of the compensation element 422 onto the prism substrate 421. In order to ensure that the display device is thin after the compensator is applied to the display device, the compensation element 422 is arranged on the light-entering side of the prism substrate 421. As shown in FIG. 16, the light-outgoing side of the prism substrate 421 may be non-planar. For example, the surface shape of the light-outgoing side of the prism substrate 421 matches the surface shape of the side of the free-form prism 410 close to the prism substrate 421. In an example, both of the light-outgoing side of the prism substrate 421 and the side of the free-form prism 410 close to the prism substrate 421 are a concave free-form surface. Where, the free-form prism 410 is configured for imaging and is able to form an enlarged image. At least one surface of the free-form surface prism 410 is a free-form surface. A propagation direction of light (such as ambient light) changes when directly passing through the free-form prism 410, which results in imaging deformation (optical aberration). In the present embodiment, the imaging deformation is compensated and corrected based on the compensation element 422.

In the present embodiment, the compensation element 422 realizes phase compensation for light incident on the compensation element 422 which is achieved by virtue of the metasurface unit cells in the compensation element 422, so that an incident direction of light before hitting the compensation element is the same as an outgoing direction of light after passing through the metasurface unit cells (i.e., the compensation element 422), the prism substrate 421 and the free-form prism 410. As shown in FIG. 16, a light beam A is incident on the compensation element 422 in the compensator. The corresponding metasurface unit cells in the compensation element 422 performs the phase compensation for the light beam A. Generally, a propagation direction of the light beam A after compensation is different from a propagation direction of the light beam A before the compensation. Then, the light beam A after the compensation sequentially passes through the prism substrate 421 and the free-form prism 410, and is converted into a light beam B. The light beam B is outgoing light obtained after the light beam A passes through the compensator and the free-form prism 410. A propagation direction of the light beam B is the same as that of the light beam A.

Optionally, the compensation element 422 is arranged on the light-entering side of the prism substrate 421. An incident direction of light directed to the metasurface unit cell is the same as an outgoing direction of light after sequentially passing through the metasurface unit cell, the prism substrate 421 and the free-form prism 410 located on the light-outgoing side of the prism substrate 421.

It is understandable to those skilled in the art that the light-entering side and the light-outgoing side of the prism substrate 421 in the present embodiment are only relative terms, which are not intended to limit the transmission of light from the light-entering side to the light-outgoing side. As shown in FIG. 16, light passes through the prism substrate 421 from left to right, that is, the light propagates from the light-outgoing side of the prism substrate 421 to the light-entering side of the prism substrate 421. In FIG. 16, the compensation element 422 is still capable of performing phase compensation for the light when the light travels through the free-form prism 410, the prism substrate 421, and the compensation element 422 sequentially from left to right.

The present embodiment provides a display device, in which the metasurface unit cells of the compensation element 422 of the compensator performs phase compensation for light, so that the incident direction of the light directed to the compensator is the same as the outgoing direction of the light after passing through the compensator and the free-form prism 410. Thus, the light passes through the compensator and the free-form prism 410 in an afocal and undistorted way. The light passing through the compensator and the free-form prism 410 enters the human eyes, such that the human eyes observe the external environment normally. In addition, the metasurface unit cells are thin, and it is also feasible to design the prism substrate 421 to have a small thickness. Therefore, the compensator and the free-form prism 410 form an afocal and thin display device, thereby achieving thinness and lightness, and providing convenience and ease for users.

Based on the above embodiments, phase errors of the metasurface unit cells in the compensation element 422 at a plurality of target wavelengths meet a minimum error condition. Where, respective phase errors refer to a difference between an actual compensation phase provided by the metasurface unit cells at the target wavelengths and a theoretical compensation phase required to be provided by the metasurface unit cells at the same target wavelengths.

In the present embodiment, a structural database containing the plurality of metasurface unit cells may be preset. The structural database may be an existing database, or a new database obtained by adaptively adding new metasurface unit cells in the existing database. The compensation effect of a certain metasurface unit cell for light at different wavelengths is generally different. The compensation effect of different metasurface unit cells in the structural database for light of the same wavelength is also different. In the present embodiment, the target wavelength is a wavelength that needs to be compensated. The target wavelength may include wavelengths in the visible spectrum. Based on the shape and the structure of the compensator and the free-form prism 410, it is feasible to determine the required compensation phase for light at each target wavelength, that is, determining the theoretical phase. Moreover, based on the structural database, it is also feasible to determine the compensation phase provided by each metasurface unit cell for light of different target wavelengths, that is, determining the actual compensation phase. In the present embodiment, a difference between the theoretical phase and the actual compensation phase at the same target wavelength is used as a phase difference value at the target wavelength. If phase errors of a certain metasurface unit cell at multiple target wavelengths meet the minimum error condition, it means that there are not many differences between the phase compensation effect of the metasurface unit cell and the compensation effect of the required theoretical phase. In this case, the metasurface unit cell may be selected as a corresponding metasurface unit cell in the compensation element 422.

Optionally, the minimum error condition is satisfied when a weighted sum $$\Delta_m^{x,y}$$

of the phase errors is minimum. That is, the obtained weighted sum $$\Delta_m^{x,y}$$

of the phase errors is the smallest, for the selected metasurface unit cells in the compensation element 422, when compared with other metasurface unit cells in the structural database. In the present embodiment, the weighted sum of the phase errors is expressed as follows:

$$\Delta_m^{x,y} = \sum_j c_i |\varphi_{the}(\lambda_i, x, y) - \varphi_m(\lambda_i, x, y)|;$$

where, (x, y) represents coordinates of respective metasurface unit cells; m is a serial number of a metasurface unit cell at (x, y) in the structural database; $\lambda_i$ is an i-th target wavelength, and $c_i$ is a weight coefficient of the i-th target wavelength $\lambda_i$; $\varphi_m(\lambda_i, x, y)$ is an actual compensation phase provided by the metasurface unit cell at (x, y) at the i-th target wavelength $\lambda_i$; $\varphi_{the}(\lambda_i, x, y)$ is a theoretical compensation phase required to be provided by the metasurface unit cell at (x, y) at the i-th target wavelength $\lambda_i$. $\varphi_{the}(\lambda_i, x, y)$ is expressed by a following formula:

$$\varphi_{the}(\lambda_i, x, y) = \mathrm{mod}\left(-\frac{2\pi}{\lambda_i} n_1 t_{x,y} - \frac{2\pi}{\lambda_i} n_2 T_{x,y}, 2\pi\right);$$

where, $n_1$ is a refractive index of the prism substrate 421; $t_{x,y}$ is a thickness of the prism substrate 421 in a light propagation direction corresponding to the metasurface unit cell at (x, y); and $n_2$ is a refractive index of the free-form prism 410; $T_{x,y}$ is a thickness of the free-form prism 410 in a light propagation direction corresponding to the metasurface unit cell at (x, y).

In the present embodiment, the compensation element 422 is configured to be divided into the plurality of metasurface unit cells. The metasurface unit cells at different positions of the compensation element 422 are not exactly the same. In the present embodiment, the metasurface unit cell arranged at the position (x, y) on the compensation element 422 represents the corresponding metasurface unit cell. For example, the side of the prism substrate 421 close to the compensation element 422 is a plane. The metasurface unit cells of the compensation element 422 are distributed on the plane. In this case, the position coordinate (x, y) of the metasurface unit cell on the plane may be used as the identification (ID) of the metasurface unit cell.

In order to enable the compensator and the free-form prism 410 to form an afocal optical system, for any target wavelength $\lambda_i$, if the optical power of the free-form prism 410 is $\Phi_1(\lambda_i)$ and the optical power of the compensator is $\Phi_2(\lambda_i)$, it is needed to satisfy a condition of $\Phi_1(\lambda_i)+\Phi_2(\lambda_i)=0$. Therefore, when ambient light is incident on the optical system, if a phase of the free-form prism 410 in an optical path of the ambient light is $\varphi_i(\lambda_i)$ and a phase of the compensator in the optical path of the ambient light is $\varphi_2(\lambda_i)$, it is needed to satisfy a condition of $\mathrm{mod}(\Phi_1(\lambda_i)+\Phi_2(\lambda_i),2\pi)=0$. Moreover, the prism substrate 421 and the metasurface unit cell of the compensator also have corresponding phases: $\varphi_{21}(\lambda_i)$ and $\varphi_{Meta}(\lambda_i)$ respectively on the optical path of the ambient light, and there is a condition of $\varphi_2(\lambda_i)=\varphi_{Meta}(\lambda_i)+\varphi_{21}(\lambda_i)$. Therefore, the required phase of the metasurface unit cell satisfies a condition of $\varphi_{Meta}(\lambda_i)=-\varphi_1(\lambda_i)-\varphi_{21}(\lambda_i)\pm 2k\pi$, and the phase $\varphi_{Meta}(\lambda_i)$ is the theoretical phase that needs to be compensated at the target wavelength λj.

Figure 17:
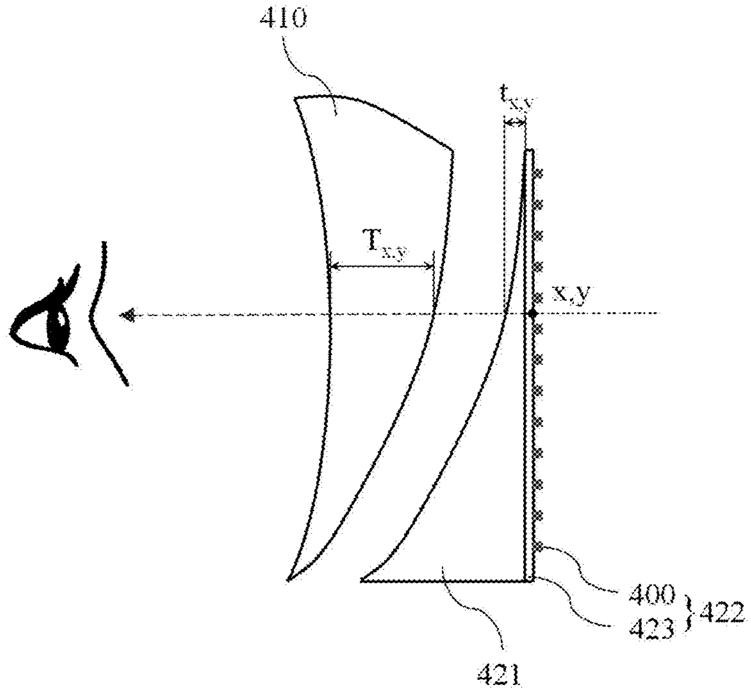
FIG. 17 schematically shows a third structure of an image combiner according to an embodiment of the present disclosure.

As shown in FIG. 17, for the metasurface unit cell at (x, y), a thickness of the prism substrate 421 in a corresponding light propagation direction is $t_{x,y}$, and then a phase $\varphi_{21}(\lambda_i, x,y)$ of $$\frac{2\pi}{\lambda_i} n_1 t_{x,y};$$

correspondingly, the thickness of the free-form the prism substrate 421 at (x, y) is prism 410 in the light propagation direction corresponding to the metasurface unit cell at (x, y) is $T_{x,y}$, then the phase $\varphi_1(\lambda_i,x,y)$ of the free-form prism 410 at (x, y) is $$\frac{2\pi}{\lambda_i} n_2 T_{x,y}.$$

Therefore, for the metasurface unit cell at (x, y), the theoretical phase that needs to be compensated at the target wavelength $\lambda_i$ is described as follows:

$$\varphi_{the}(\lambda_i, x, y) = \mathrm{mod}\left(-\varphi_{21}(\lambda_i, x, y) - \varphi_1(\lambda_i, x, y), 2\pi\right) = \mathrm{mod}\left(-\frac{2\pi}{\lambda_i} n_1 t_{x,y} - \frac{2\pi}{\lambda_i} n_2 T_{x,y}, 2\pi\right)$$

where, $\varphi_1(\lambda_i,x,y)$ is the phase of the free-form prism 410 corresponding to the metasurface unit cell at (x, y); and $\varphi_{21}(\lambda_i,x,y)$ is the phase of the prism substrate 421 corresponding to the metasurface unit cell at (x, y); $n_1$ is the refractive index of the prism substrate 421; $n_2$ is the refractive index of the free-form prism 410; generally, $n_1$ is equal to $n_2$, for example, the prism substrate 421 and the free-form prism 410 are made of the same material. In an embodiment, the prism substrate 421 and the free-form prism 410 are both made of glass.

For any transmissive unit cell k ($k \in A$) in the structural database A, it is able to determine the actual compensation phase of the metasurface unit cell k at the corresponding target wavelength $\lambda_i$. In other words, it is able to determine the actual compensation phase $\varphi_k$ ($\lambda_i$, x, y) of the metasurface unit cell K at (x, y), as well as the weighted sum $$\Delta_k^{x,y}$$

of multiple phase errors. Furthermore, the metasurface unit cell m corresponding to the smallest weighted sum is determined. That is, for any k, $$k, \Delta_m^{x,y} \leq \Delta_k^{x,y}.$$

Therefore, the metasurface unit cell m in the structural database is used as the metasurface unit cell at (x, y). Metasurface unit cells at other positions of the compensation element 422 can be determined in the same way. Details thereof will not be repeated herein.

Where, corresponding weight coefficients $c_i$ are set for different target wavelengths $\lambda_i$. Optionally, the target wavelengths at least include wavelengths corresponding to yellow light, green light, red light, and purple light. In addition, the smaller value of the weight coefficients of the yellow light and the green light is not less than the larger value of the weight coefficients of the red light and the purple light. That is, the yellow light and the green light have larger weight coefficients, whereas, the red light and the purple light have smaller weight coefficients. The metasurface unit cell determined based on the weighted sum is able to better compensate the yellow light and the green light to which the human eye is more sensitive, thereby improving the viewing experience of the human eye.

The light-splitting surface 413 of the free-form prism 410 and the light-outgoing side of the prism substrate 421 of the compensator 420 match each other in the surface profile and each of the two is generally a free-form surface, such that that the free-form prism 410 and the prism substrate 421 are able to be adhered to each other. In an example, the free-form prism 410 and the prism substrate 421 are adhered to each other by glue. If the refractive index of the free-form prism 410 and the refractive index of the prism base 421 are equal to a same value, the refractive index of the glue is similar to the same value. For example, an error between the same value and the refractive index of the glue does not exceed 0.1.

In addition, since the light-splitting surface 413 is capable of modulating both reflected and transmitted light, incident ambient light A is partially reflected when passing through the light-splitting surface 413, that is, the light-splitting surface 413 reflects part of the ambient light. In order to ensure that the human eye observes the external environment with normal brightness, the light-splitting surface 413 needs to have sufficient transmittance. In the present embodiment, a ratio of transmittance to reflectance of the light-splitting surface 413 is not less than $(I_{max}-I_0)/I_0$; where $I_{max}$ is the maximum brightness of the external imaging light, and $I_0$ is the maximum brightness required for imaging. Generally, the ratio of transmittance to reflectance of the light-splitting surface 413 is greater than 1, that is, most light is transmitted and a small amount of light is reflected when light hits the light-splitting surface 413.

Based on any of the above embodiments, as shown in FIG. 17, the compensation element 422 of the compensator includes a third transparent substrate layer 423 and a plurality of second nanostructures 400. Where, a portion of the second nanostructure 400 and the third transparent substrate layer 423 may be divided into a metasurface unit cell. Each metasurface unit cell is capable of modulating incident light. The second nanostructures 400 are able to directly modulate light physical characteristics, for example, modulating the light phase. In the present embodiment, respective second nanostructures 400 are all-dielectric, which has high transmittance at least in the visible spectrum. The available materials of the second nanostructures 400 include: titanium oxide, silicon nitride, fused quartz, aluminum oxide, gallium nitride, gallium phosphide and hydrogenated amorphous silicon. Where, the plurality of second nanostructures 400 are arranged in an array, and thus are able to be divided into a plurality of unit cells. The obtained unit cells may be regular hexagonal, square, fan-shaped, etc. A center of each unit cell is provided with a nanostructure, or each of a center and vertex positions of each unit cell is provided with a nanostructure. Where, all the second nanostructures 400 may be arranged on the same side of the third transparent substrate layer 423. Or, a part of the second nanostructures 400 may be arranged on a side of the third transparent substrate layer 423, and the other part of the nanostructures may be arranged on the other side of the third transparent substrate layer 423. The present embodiment is not limited thereto.

It should be noted that the third transparent substrate layer 423 is of a layer structure on the whole. The plurality of metasurface unit cells in the compensation element 422 are obtained by conceptual dividing. That is, the plurality of second nanostructures 400 are arranged on the third transparent substrate layer 423, and are divided into unit cells; and each unit cell may include at least one second nanostructure 400. Or, the plurality of metasurface unit cells may form the compensation element 422 in an integrated structure.

Figure 18:
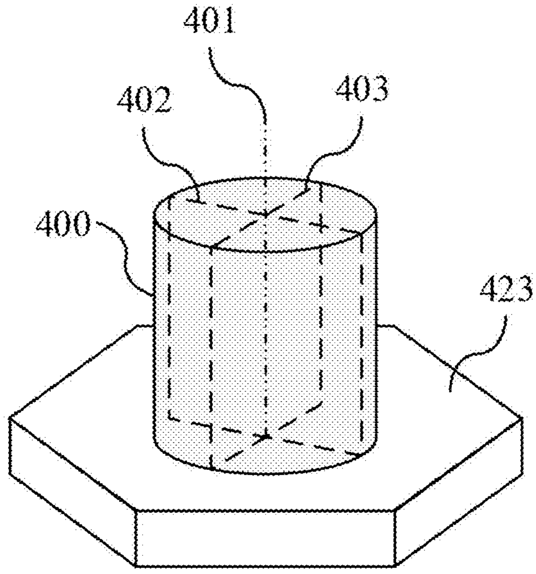
FIG. 18 schematically shows a structure of a second nanostructure according to an embodiment of the present disclosure.

Optionally, the compensator in the present embodiment is mainly configured to provide a compensation phase for external ambient light. Since the ambient light is polarization-independent, the nanostructures of the present embodiment are designed to be of a symmetrical structure (a polarization-independent structure), such that the second nanostructures 400 are insensitive to the polarization of incident light. As shown in FIG. 18, a second nanostructure 400 is of an upright structure with a central axis 401 in a height direction of the second nanostructure 400; and the upright structure may be a pillar structure. The second nanostructure 400 includes a first symmetric plane 402 and a second symmetric plane 403 that are perpendicular to each other. Referring to FIG. 18, the first symmetric plane 402 and the second symmetric plane 403 intersect at the central axis 401 of the upright structure. An intersection between the first symmetric plane and the upright structure forms a first intersection line, and an intersection between the second symmetric plane and the upright structure forms a second intersection line. A shape of the first intersection line is the same as a shape of the second intersection line. The second intersection line overlaps with the first intersection line after rotating 90° around the central axis 401. As shown in FIG. 18, the second nanostructure 400 is a solid cylinder, and both of the first intersection line and the second intersection line are rectangles with exactly the same size.

For example, the second nanostructure 400 may be a cylinder as shown in FIG. 18, or the second nanostructure 400 may be a regular prism with 4n lateral edges, where n is a positive integer. For example, the second nanostructure 400 may be a regular square prism, a regular octagonal prism, etc. In addition, the metasurface unit cell shown in FIG. 18 is only illustrative, and is not intended to limit the metasurface unit cell to have the dimension and the dimensional proportion as shown in FIG. 18. The metasurface unit cells with the required size may be designed or selected according to actual requirements.

Optionally, in the case where the display device includes an image source 1, the imaging light emitted by the image source 1 may be polarized light. The nanostructures 200 of the relay redirector 2 may be of a structure sensitive to polarized light. The nanostructures 200 of the relay redirector 2 may also be referred to as the first nanostructures 200. As shown in FIG. 9, the nanostructure 200 is of an upright structure with a central axis 201 in a height direction of the nanostructure 200; and the upright structure may be a pillar structure. The nanostructure 200 includes a first plane 202 and a second plane 203 that pass through the central axis 201 and are perpendicular to each other. An intersection between the first plane 202 and the upright structure forms a first intersection line, and an intersection between the second plane 203 and the upright structure forms a second intersection line. The second intersection line does not completely overlap with the first intersection line after rotating 90° around the central axis 201.

Optionally, the image source 1 may include a first display capable of emitting polarized light; and the first display may be a liquid crystal display or the like. Optionally, the image source 1 includes a second display, a polarizer and a quarter-wave plate; both of the polarizer and the quarter-wave plate are arranged between the second display and the metasurface; and the light emitted from the second display sequentially passes through the polarizer and the quarter-wave plate, and finally reaches the metasurface 20. Where, the polarizer converts the imaging light emitted from the second display into circularly polarized light, and then the quarter-wave plate converts the circularly polarized light into linearly polarized light, which facilitates the nanostructures 200 to modulate the linearly polarized imaging light.

The present embodiment also provides a near-eye display system, which includes the display device as provided in any of the above embodiments. Based on the near-eye display device, the human eye is able to observe the image formed by the image source 1 and the external environment normally. Where, the wording “near-eye” means that the display device (such as the image combiner 4) is close to the human eye. A distance between the display device and the human eye is generally less than 10 cm, for example, being in a range of 1-3 cm. The near-eye display system may be applied to glasses. As shown in FIG. 14, the image source 1, the relay redirector 2, the image combiner 4, etc., are all arranged on a spectacle frame 6, so that the user wearing the spectacle frame can see the image formed by the image source 1, thereby realizing the augmented reality (AR) display.

The embodiments of the present disclosure mentioned above are illustrative, and are not intended to limit the present disclosure. The scope of the embodiments of the present disclosure is not limited thereto. All variations, substitutions or improvements based on the spirits and principles of the present disclosure fall within the scope of the present disclosure. Consequently, the scope of the present application is defined by the appended claims.

What is claimed is:

1. A relay redirector, comprising: a metasurface and a supporting part;

wherein the metasurface is arranged on the supporting part; and the metasurface is configured to adjust a propagation direction of outgoing light leaving the metasurface by modulating a phase of incident light hitting the metasurface, so as to direct the incident light hitting the metasurface towards a light-outgoing side of the metasurface and form a real image in a preset area on the light-outgoing side of the metasurface, wherein the metasurface comprises a reflective metasurface or a transmissive metasurface combined with a reflective element;

wherein the reflective metasurface comprises a reflective layer and a plurality of nanostructures, wherein the plurality of the nanostructures are provided on a side of the reflective layer close to a light-entering side and the light-outgoing side of the metasurface;

wherein the transmissive metasurface comprises a plurality of transmissive unit cells being capable of providing a modulation phase, wherein the transmissive unit cells are configured to transmit at least part of incident light hitting the transmissive unit cells to obtain transmitted light leaving the transmissive metasurface; and wherein the reflective element is configured to reflect incident light hitting the reflective element to the light-outgoing side of the metasurface, and a first deflection angle is greater than or equal to a second deflection angle, wherein the first deflection angle refers to a deflection angle of a first propagation direction of the incident light entering the transmissive unit cells relative to the transmission reference position, and the second deflection angle refers to a deflection angle of a second propagation direction of transmitted light leaving the transmissive unit cells relative to the transmission reference position, and wherein the transmission reference position is coplanar with the transmissive metasurface.

2. The relay redirector according to claim 1, wherein the transmitted light leaving the transmissive metasurface is capable of forming the real image.

3. The relay redirector according to claim 2, wherein the transmissive metasurface is configured to transmit the incident light hitting the transmissive unit cells to the reflective element; and the reflective element is configured to reflect the transmitted light leaving the transmissive metasurface to the light-outgoing side of the metasurface; or, the reflective element is configured to reflect the incident light hitting the reflective element to the transmissive metasurface to obtain reflected light leaving the reflective element, and the transmissive metasurface is configured to transmit the reflected light leaving the reflective element to the light-outgoing side of the metasurface.

4. The relay redirector according to claim 2, wherein the supporting part comprises a relay substrate; and the relay substrate at least comprises a light-entering surface, a reflecting surface and a light-outgoing surface;

the reflective element is arranged on the reflecting surface, and is configured to reflect incident light hitting the light-entering surface to the light-outgoing surface; and the transmissive metasurface is provided on the light-entering surface or the light-outgoing surface.

5. The relay redirector according to claim 4, wherein the light-entering surface of the relay substrate is perpendicular to the light-outgoing surface of the relay substrate.

6. The relay redirector according to claim 2, wherein the transmissive metasurface comprises a first transparent substrate layer and a plurality of nanostructures on the first transparent substrate layer.

7. The relay redirector according to claim 2, wherein the modulation phase provided by the transmissive unit cells is expressed by a following formula:

$$\phi(r, \lambda_i) = \frac{2\pi}{\lambda_i} \sum_j a_{i,j} r^{2j},\ j = 1, 2, \ldots, N;$$

wherein, r is a radial coordinate of the transmissive unit cells, $\lambda_i$ is an i-th wavelength that needs to be adjusted, $a_{i,j}$ is a preset j-th phase coefficient corresponding to the i-th wavelength, and N is a positive integer and is not less than 3.

8. The relay redirector according to claim 1, wherein a difference between a cotangent value of the second deflection angle and a cotangent value of the first deflection angle is a constant value; and the constant value is positively correlated to a distance between the transmissive unit cells to the transmission reference position.

9. The relay redirector according to claim 1, wherein the reflective metasurface is configured to be divided into a plurality of reflective unit cells capable of providing the modulation phase; the reflective unit cells are configured to direct at least part of light from a first position towards a second position in the preset area, so as to form the real image at the second position; and the first position and the second position are in a one-to-one correspondence.

10. The relay redirector according to claim 9, wherein the reflective metasurface comprises a reflective layer, a second transparent substrate layer and a plurality of nanostructures; the second transparent substrate layer is provided on the side of the reflective layer close to the light-entering side and the light-outgoing side of the metasurface; and the plurality of the nanostructures are provided on a side of the second transparent substrate layer away from the reflective layer.

11. The relay redirector according to claim 1, wherein the supporting part comprises a supporting layer; the reflective metasurface is provided on the support layer; or the supporting part comprises a relay substrate; the relay substrate at least comprises a light-entering surface, a reflecting surface and a light-outgoing surface; the reflective metasurface is provided on the reflecting surface for directing incident light from the light-entering surface towards the light-outgoing surface.

12. The relay redirector according to claim 11, wherein the light-entering surface of the relay substrate is perpendicular to the light-outgoing surface of the relay substrate.

13. A display device, comprising: the relay redirector of claim 1 and an image combiner;

the relay redirector is configured to generate the real image on a light-entering side of the image combiner; and the image combiner is configured to modulate imaging light emitted by the real image to an observation area.

14. The display device according to claim 13, wherein the image combiner comprises a free-form prism and a compensator;

the free-form prism comprises a transmissive surface, a transflective surface and a light-splitting surface; the compensator is provided on the light-splitting surface;

the transmissive surface is configured to transmit the imaging light emitted by the real image and direct the transmitted imaging light towards the transflective surface; the transflective surface is configured to totally reflect the imaging light transmitted by the transmissive surface to the light-splitting surface; the light-splitting surface is configured to reflect the imaging light totally reflected by the transflective surface to the transflective surface;

the transflective surface is also configured to transmit the imaging light reflected by the light-splitting surface; and the compensator is configured to compensate dioptric power of the free-form prism, so that the image combiner is afocal.

15. The display device according to claim 14, wherein the compensator comprises a prism substrate and a compensation element; the compensation element is configured to be divided into a plurality of metasurface unit cells;

the compensation element is provided on a side of the prism substrate;

the metasurface unit cells of the compensation element are configured to provide a compensation phase for light passing through the metasurface unit cells; and a propagation direction of incident light traveling towards the compensator is the same as a propagation direction of outgoing light obtained after the incident light sequentially passes through the metasurface unit cells, the prism substrate and the free-form prism arranged on a light-outgoing side of the prism substrate.

16. The display device according to claim 15, wherein phase errors of the metasurface unit cells at a plurality of target wavelengths meet a minimum error condition; and respective phase errors refer to a difference between an actual compensation phase provided by the metasurface unit cells at the target wavelengths and a theoretical compensation phase required to be provided by the metasurface unit cells at the same target wavelengths.

17. The display device according to claim 16, wherein the minimum error condition is satisfied when a weighted sum of the phase errors is minimum, and the weighted sum of the phase errors is expressed by a following formula:

$$\Delta_m^{x,y} = \sum_j c_i |\varphi_{the}(\lambda_i, x, y) - \varphi_m(\lambda_i, x, y)|;$$

wherein, (x, y) represents coordinates of respective metasurface unit cells, m is a serial number of a metasurface unit cell at (x, y) in a structural database, $\lambda_i$ is an i-th target wavelength, and $c_i$ is a weight coefficient of the i-th target wavelength $\lambda_i$; $\varphi_m(\lambda_i, x, y)$ is an actual compensation phase provided by the metasurface unit cell at (x, y) at the i-th target wavelength $\lambda_i$; $\varphi_{the}(\lambda_i, x, y)$ is a theoretical compensation phase required to be provided by the metasurface unit cell at (x, y) at the i-th target wavelength $\lambda_i$ and is expressed by a following formula:

$$\varphi_{the}(\lambda_i, x, y) = \mathrm{mod}\left(-\frac{2\pi}{\lambda_i} n_1 t_{x,y} - \frac{2\pi}{\lambda_i} n_2 T_{x,y}, 2\pi\right);$$

wherein, $n_1$ is a refractive index of the prism substrate, $t_{x,y}$ is a thickness of the prism substrate in a light propagation direction corresponding to the metasurface unit cell at (x, y), and $n_2$ is a refractive index of the free-form prism, $T_{x,y}$ is a thickness of the free-form prism in a light propagation direction corresponding to the metasurface unit cell at (x, y).

18. The display device according to claim 15, wherein the compensation element comprises a third transparent substrate layer and a plurality of second nanostructures; respective second nanostructures are of an upright structure having a central axis in a height direction of the upright structure; and the upright structure has a first symmetric plane and a second symmetric plane that are perpendicular to each other; and the first symmetric plane and the second symmetric plane intersect at the central axis of the upright structure; an intersection between the first symmetric plane and the upright structure forms a first intersection line, and an intersection between the second symmetric plane and the upright structure forms a second intersection line; a shape of the first intersection line is the same as a shape of the second intersection line.

19. A near-eye display system, comprising the display device of claim 13.

* * * * *